United States Patent
Sun et al.

(10) Patent No.: US 12,300,431 B2
(45) Date of Patent: May 13, 2025

(54) ELECTROMAGNETIC DEVICES, ELECTROMAGNETIC ACTUATION SYSTEMS, AND METHODS THEREOF FOR GRADIENT ENHANCEMENT

(71) Applicant: City University of Hong Kong, Hong Kong (CN)

(72) Inventors: Dong Sun, Hong Kong (CN); Wah Shing Lam, Hong Kong (CN); Yingxin Huo, Hong Kong (CN)

(73) Assignee: City University of Hong Kong, Hong Kong (CN)

( * ) Notice: Subject to any disclaimer, the term of this patent is extended or adjusted under 35 U.S.C. 154(b) by 378 days.

(21) Appl. No.: 18/051,532

(22) Filed: Nov. 1, 2022

(65) Prior Publication Data

US 2024/0145145 A1 May 2, 2024

(51) Int. Cl.
| | |
|---|---|
| *H01H 47/00* | (2006.01) |
| *B25J 7/00* | (2006.01) |
| *B25J 15/06* | (2006.01) |
| *H01F 7/06* | (2006.01) |
| *H01F 7/20* | (2006.01) |

(52) U.S. Cl.
CPC ............. *H01F 7/206* (2013.01); *B25J 7/00* (2013.01); *B25J 15/0608* (2013.01); *H01F 7/064* (2013.01)

(58) Field of Classification Search
None
See application file for complete search history.

(56) References Cited

U.S. PATENT DOCUMENTS

| | | | | |
|---|---|---|---|---|
| 4,362,990 | A | * | 12/1982 | Schneider ............... H01F 38/20 336/212 |
| 2004/0209281 | A1 | | 10/2004 | Monajembashi |
| 2010/0204674 | A1 | | 8/2010 | Forbes et al. |
| 2012/0229129 | A1 | * | 9/2012 | Kochergin ......... G01R 33/1284 356/213 |
| 2013/0060130 | A1 | | 3/2013 | Park et al. |
| 2018/0071505 | A1 | | 3/2018 | Lo et al. |

FOREIGN PATENT DOCUMENTS

| | | |
|---|---|---|
| EP | 3274044 A1 | 1/2018 |
| WO | 2013168852 A1 | 11/2013 |

OTHER PUBLICATIONS

M. P. Kummer, J. J. Abbott, B. E. Kratochvil, R. Borer, A. Sengul, and B. J. Nelson, "OctoMag: An electromagnetic system for 5-DOF wireless micromanipulation," IEEE Trans. Robot., 26, 1006-1017, (2010).

(Continued)

*Primary Examiner* — Stephen W Jackson
(74) *Attorney, Agent, or Firm* — S&F/WEHRW

(57) ABSTRACT

One embodiment includes an electromagnetic device for generating a magnetic field in a workspace. The electromagnetic device includes an elongated sleeve defining a hollow space and having an external surface, a magnetic core, and an electric coil wounded onto the external surface of the elongated sleeve and configured to generate the magnetic field when energized. The magnetic core has a first end, a second end, and a middle portion that is disposed between the first end and the second end and received in the hollow space. The first end is provided with a core tip that is shaped substantially as a cone and has a cone radius greater than zero.

19 Claims, 14 Drawing Sheets

(56) References Cited

OTHER PUBLICATIONS

E. Diller, J. Giltinan, G. Z. Lum, Z. Ye, and M. Sitti, "Six-degree-of-freedom magnetic actuation for wireless microrobotics," Int. J. Robot. Res., 35, 114-128, (2015).
S. Schuerle, S. Erni, M. Flink, B. E. Kratochvil, and B. J. Nelson, "Three-dimensional magnetic manipulation of micro- and nanostructures for applications in life sciences," IEEE Transactions on Magnetics, 49, 321-330, (2013).
V. Garcia-Gradilla, J. Orozco, S. Sattayasamitsathit, F. Soto, Filiz Kuralay, A. Pourazary, A. Katzenberg, W. Gao, Y. Shen, and J. Wang, "Functionalized ultrasound-propelled magnetically guided nanomotors: Toward practical biomedical applications," ACS Nano, 7, 9232-9240, (2013).
X. Li, H. Yang, J. Wang, and D. Sun, "Design of a robust unified controller for cell manipulation with a robot-aided optical tweezers system," Automatica, 55, 279-286, (2015).
B. R. Donald, C. G. Levey, C. D. McGray, I. Paprotny, and D. Rus, "An untethered, electrostatic, globally controllable MEMS microrobot," Journal of Microelectromechanical Systems, 15, 1-15, (2006).
J. Nam, W. Lee, E. Jung, G. Jang, "Magnetic navigation system utilizing a closed magnetic circuit to maximize magnetic field and a mapping method to precisely control magnetic field in real time," IEEE Transactions on Industrial Electronics, 65, 5673-5681, (2018).

\* cited by examiner

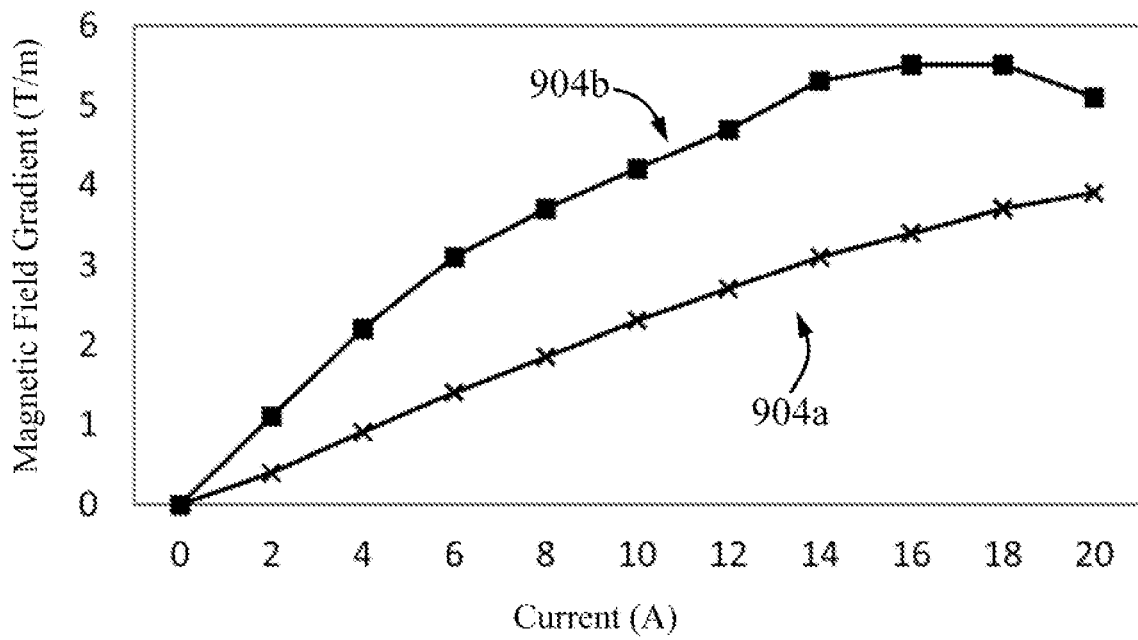

FIG. 9B

```
┌─────────────────────────────────────────────────────────────┐
│ Grouping one or more pairs of electromagnetic devices into one │
│                    or more groups                           │
│                        1002                                 │
└─────────────────────────────────────────────────────────────┘
                              │
                              ▼
┌─────────────────────────────────────────────────────────────┐
│   Forming activation strategies for the one or more groups  │
│                        1004                                 │
└─────────────────────────────────────────────────────────────┘
                              │
                              ▼
┌─────────────────────────────────────────────────────────────┐
│ Generating a gradient-enhanced magnetic field by adopting the│
│      activation strategies for the one or more groups       │
│                        1006                                 │
└─────────────────────────────────────────────────────────────┘
```

FIG. 10

ELECTROMAGNETIC DEVICES, ELECTROMAGNETIC ACTUATION SYSTEMS, AND METHODS THEREOF FOR GRADIENT ENHANCEMENT

FIELD OF THE INVENTION

The present invention relates to electromagnetic devices, electromagnetic actuation systems, and methods thereof for gradient enhancement.

BACKGROUND

Manipulation of actuation subject, such as microagents, microparticles, microrobots, or the like, is important in many industrial applications. For example, it would be desirable to manipulate microagents to perform certain tasks (such as cleaning, repairing, transporting, etc.) in harsh industrial environment that is dangerous for human beings or is difficult to access. As another example, precision targeted therapy is a modern medical treatment that can precisely locate a lesion in a human body and deliver drugs or therapeutic cells to interact with it. The used drugs or cells can identify specific genes, proteins, and environmental characteristics (pH values, temperature, osmotic pressure, etc.) that are involved in the lesion tissue. Using microagents as carriers to deliver these drugs or cells has been commonly recognized as a promising solution, and its feasibility has been verified in recent years. Microagents can be small particles in the range of a few microns or less, which can protect the drug from degradation and control drug release over a certain period of time, or relatively large microrobots ranging from tens to hundreds of microns, which can deliver cells on the basis of appropriately designed three-dimensional (3D) structures to facilitate loading, adhesion, transport, and release of functional cells.

New devices, systems, and methods that assist in advancing technological needs and industrial applications in control of various actuation subject are desirable.

SUMMARY

According to one aspect of the embodiments, it is provided with an electromagnetic device for generating a magnetic field in a workspace. The electromagnetic device comprises an elongated sleeve defining a hollow space and having an external surface, a magnetic core, and an electric coil wounded onto the external surface of the elongated sleeve and configured to generate the magnetic field when energized. The magnetic core has a first end, a second end, and a middle portion that is disposed between the first end and the second end and received in the hollow space. The first end is provided with a core tip that is shaped substantially as a cone and has a cone radius greater than zero.

According to another aspect of the embodiments, it is provided with an electromagnetic actuation system for generating a gradient-enhanced magnetic field in a workspace. The system includes one or more pairs of electromagnetic devices. Each electromagnetic device includes an elongated sleeve that defines a hollow space and has an external surface, an electric coil wounded onto the external surface of the elongated sleeve, a magnetic core, and actuation means for actuating a relative movement between the magnetic core and the elongated sleeve. The magnetic core has a first end, a second end, and a middle portion that is disposed between the first end and the second end and received in the hollow space. The second end is coupled to the actuation means. The electromagnetic devices are configured to be activated such that the gradient-enhanced magnetic field is generated in the workspace. The relative movement between the magnetic core and the elongated sleeve for one or more of the electromagnetic devices modifies the workspace.

According to yet a further aspect of the embodiments, it is provided with a method of generating a gradient-enhanced magnetic field in a workspace defined by an electromagnetic actuation system. The electromagnetic actuation system includes one or more pairs of electromagnetic devices. Each electromagnetic device includes an elongated sleeve that defines a hollow space and has an external surface, an electric coil wounded onto the external surface of the elongated sleeve, a magnetic core, and actuation means for actuating a relative movement between the magnetic core and the elongated sleeve. The method comprises grouping the one or more pairs of electromagnetic devices into one or more groups; forming activation strategies for the one or more groups, the activation strategies including one or more of section of which groups are to be activated, values of energizing current for each electric coil, direction of the energizing current, and distance between each magnetic core and the center of the workspace; and generating the gradient-enhanced magnetic field by adopting the activation strategies for the one or more groups.

Other example embodiments are discussed herein.

BRIEF DESCRIPTION OF THE DRAWINGS

FIG. 9B shows comparison of magnetic field gradient vs current relationship in a workspace generated by an electromagnetic device with or without magnetic bridge according to certain embodiments of the present invention.

FIG. 10 illustrates a method of generating a gradient-enhanced magnetic field in a workspace according to certain embodiments of the present invention.

DETAILED DESCRIPTION

Figure 1:
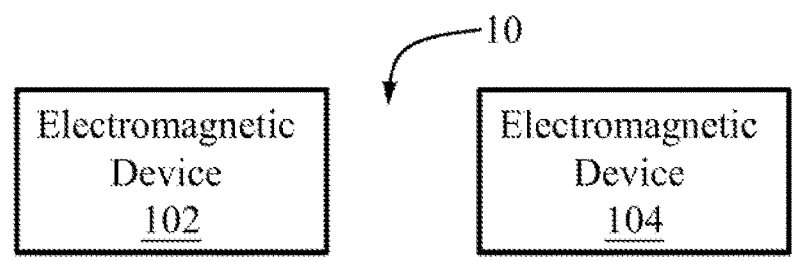
FIG. 1 illustrates a system for generating a magnetic field according to certain embodiments of the present invention.

Example embodiments relate to electromagnetic device, electromagnetic actuation system for generating a gradient magnetic field in a workspace, and/or methods of generating a gradient magnetic field in a workspace defined by an electromagnetic actuation system.

Actuation subject can be driven by magnetic field towards one or more target sites or areas. For many existing systems, the magnetic field is unsatisfactory to manipulate the actuation subject. The magnetic field may be not strong enough, thereby reducing the driving capability. The formed workspace is small or cannot be adjusted. The driving capacity depends additionally on specific configuration of the actuation subject. All these limit industrial applications of magnetic-based manipulation of actuation subject.

Example embodiments solve one or more of these problems and provide technical solutions where improved performance in one or more aspects is achieved, such as improved driving capability, flexibility, and/or expanded industrial applications.

One or more embodiments recognize the importance of magnetic field gradient in driving actuation subject. An increased gradient improves driving capacity and effectiveness. Larger gradient means the actuation subject is subject to greater driving force and can migrate more quickly in the workspace. For a swarm of microagents, for example, a larger gradient contributes to compact aggregation in a target area. The enhanced gradient shortens the time of migration. This may be of particular significance in some applications, such as clinical context, where time may matter significantly.

One or more embodiments provide novel design for an electromagnetic actuation system including electromagnetic devices. The structural design and magnetic actuation modes for the electromagnetic devices produce enhanced magnetic flux density and gradient, thereby facilitating driving of actuation subject. According to some embodiments, a magnetic flux density of around 225 mT and a magnetic field gradient of 15 T/m in a workspace of 100 mm are achieved. According to some embodiments, a magnetic flux density of around 75 mT and a magnetic field gradient of 4 T/m in a workspace of 160 mm are achieved. This renders in vivo actuation of microrobots feasible and efficient.

One or more embodiments include an electromagnetic device designed in such a way that magnetic core can be linearly moving relative to the elongated sleeve. This allows to modify the workspace, such as size, location, etc. of the workspace. For example, the size of the workspace can be 160 mm, 220 mm, or larger. This renders it suitable for applications where larger or adjustable workspace is required.

For example, an electromagnetic device includes a moveable magnetic core or robotic core that has a core tip at an end facing the workspace. The magnetic field gradient is inversely proportional to distance. Therefore, magnetic field strength and gradient decrease sharply when an actuation subject (such as a microrobot) is located far away from the magnetic core. In this regard, the movable magnetic core ensures the distance between the actuation subject and the core tip can be as close as possible to maximize the manipulation performance. The tradeoff between the magnetic gradient strength and the size of the workspace can be adjusted so as to be suitable for different application scenarios.

One or more embodiments provide a robotics core design for electromagnetic or magnetic or electric coils to develop a magnetic gradient field-based actuation system that can enable microrobot manipulation. The structure and dimension of the robotic DT4E core are designed based on parametric optimization using the finite element method. This new core shape and structure design can considerably enhance the magnetic field generated by the electromagnetic actuation system to drive microrobots in in-vivo environments with several (such as eight) electromagnetic heads with a large and changeable workspace.

One or more embodiments provide devices, systems, or methods for the gradient enhancement of electromagnetic actuation in a varying workspace due to the robotic core design for electromagnetic coils. The shape and size of the robotic core and iron bridge are designed based on parametric optimization using the finite element method for maximizing magnetic field strength and gradient generation by the electromagnetic coil. This addresses the critical need to deliver microrobots in certain applications, such as clinical applications.

One or more embodiments provides an electromagnetic actuation system actuating actuation subject (such as microrobots) carrying cells moving to a target site inside a body under control of an external gradient magnetic field. Compared with many existing systems, the provided system has a better driving capability with a larger workspace. High magnetic gradient with efficient energy consumption can further be realized.

One or more embodiments relate to biological applications. Compared with the existing interventional treatment methods, application of an external magnetic field to controlling of one or more microrobots carrying cells for treatment according to the or more embodiments can greatly reduce the trauma to the human body. Moreover, compared with one or more other existing noninvasive methods for actuating microrobots through optical tweezer, ultrasound, chemistry, etc., the driving force according to the or more embodiments is not affected by the propagation medium. Magnetic driving does not cause harm to the human body by using an external magnetic field.

Further, for many existing systems, a microrobot must meet specific requirements in structural design (e.g., a helical structure) to transform the torque into the driving force, and thereby complicating microrobot design and decreasing reliability. One or more embodiments as described herein avoid such unfavorable requirements. The actuation subject (or called magnetized object or objects) can be driven to the highest potential field to realize driving of the actuation subject.

FIG. 1 illustrates a system for generating a magnetic field according to certain embodiments of the present invention. The magnetic field can facilitate an actuation subject, such as microagent, microrobot, etc., such that the actuation subject migrates to a target site or area or performs certain tasks.

For illustrating purpose only, the system includes an electromagnetic device 102 and an electromagnetic device 104. Each electromagnetic device includes one or more magnetic components and can be energized by a proper electrical power supply to generate magnetic field. For example, a solenoid may be energized to create magnetic field.

A workspace 10 is formed or defined by the electromagnetic devices 102 and 104. The workspace 10 may be surrounded by the electromagnetic devices 102 and 104. The workspace 10 is where the actuation subject is driven under magnetic field so as to be migrating. The workspace 10 may be shaped as a sphere, a spheroid, or an irregular configuration.

By way of example, each electromagnetic device may be designed such that its one part can be moved linearly relative to another part to modify the workspace 10, such as changing size, shape, volume, etc. of the workspace 10. The size may be represented by the diameter of the smallest sphere that can enclose the workspace. The size may be represented in other manners, such as by the longest distance from one point to another point in the workspace. The size can be, for example, from 100 mm to 220 mm, such as 100 mm, 160 mm, 200 mm, 220 mm. In some embodiments, the size may be larger than 220 mm, such as 300 mm.

Figure 2A:
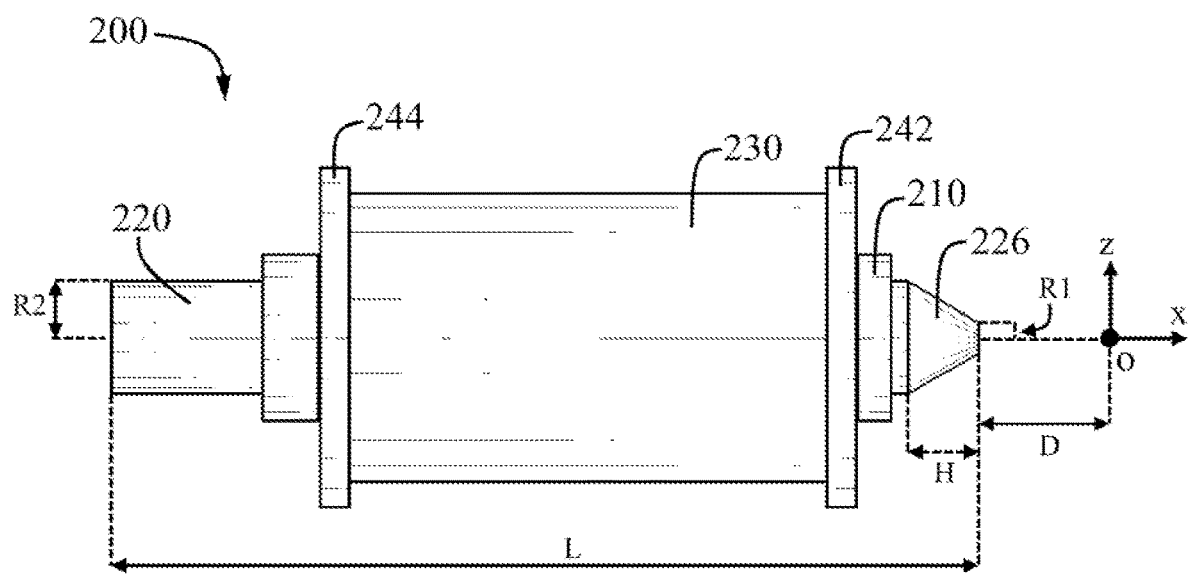
FIG. 2A illustrates an electromagnetic device for generating a magnetic field in a workspace according to certain embodiments of the present invention.
Figure 2B:
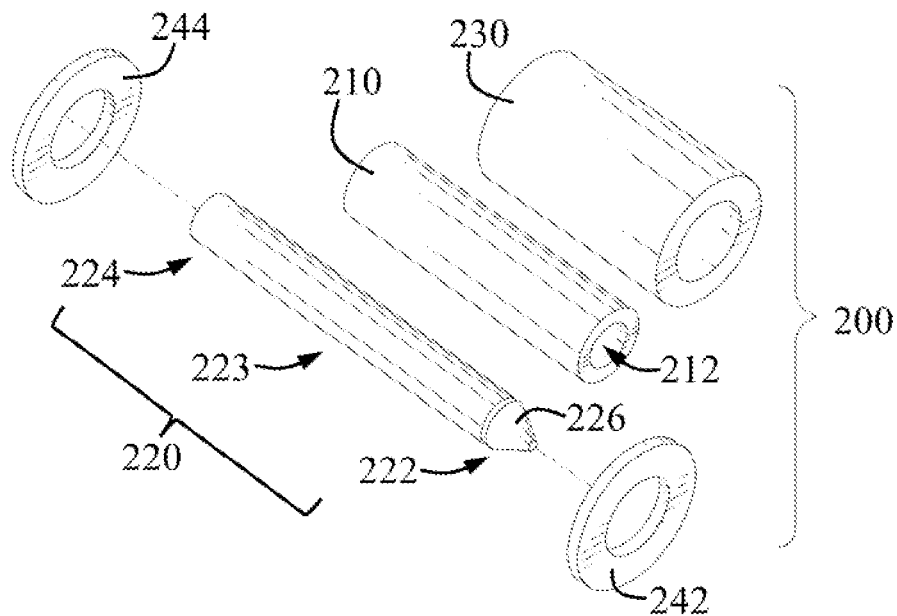
FIG. 2B is an exploded view of the electromagnetic device of FIG. 2A.

FIGS. 2A-2B illustrate an electromagnetic device 200 according to certain embodiments of the present invention. The electromagnetic device 200, for example, can be a specific implementation of electromagnetic device 102 or 104 with reference to FIG. 1.

As illustrated, the electromagnetic device 200 includes an elongated sleeve 210, a magnetic core 220, and an electric coil 230. The elongated sleeve 210 defines a hollow space 212. In the present embodiment, the elongated sleeve 210 is formed as a hollow cylinder. The elongated sleeve 210 may be shaped differently in other embodiments as long as it forms a hollow space or cavity.

The magnetic core 220, such as an iron core, has a first end 222, a second end 224, and a middle portion 223 that is disposed between the first end 222 and the second end 224. All or most of the middle portion 223 is received in the hollow space 212 such that both the first and second ends 222, 224 protrude out of the hollow space 212. The first end 222 is provided with a core tip or cone tip 226. The core tip 226 is shaped substantially as a cone and has a cone radius, R1, greater than zero, at the conical head of the core tip 226.

The electric coil 230 is wounded onto the external surface of the elongated sleeve 210 and when energized, generates the magnetic field. By way of example, the electric coil 230 includes copper wire. The turn number of the electric coil 230 is in a range from 1000 to 2000, such as 1400. The diameter of the enameled copper wire for windings is in a range from 1.5 mm to 3 cm. The electric coil 230 has a total resistance in a range from $1\Omega$ to $3\Omega$. The electric coil 230 can be energized with a maximum current in a range from 1 A to 30 A. These numeral values are for illustrating purpose only. Other numeral values may be possible according to practical needs or specific configuration.

Optionally, the electromagnetic device 200 includes fixation means for positioning the electric coil 230 onto the elongated sleeve 210. In some embodiments, the fixation means contributes to increased magnetic field flux. The fixation means can be configured according to practical needs. As illustrated in the present embodiment, the fixation means includes a first fixation means 242 and a second fixation means 244 such that the electric coil 230 is positioned or limited between the two fixation means. Each of the first and second fixation means 242, 244 has a cylindrical shape with a hole in the middle that allows a respective end of the magnetic core 220 and a respective end of the elongated sleeve 210 to pass through. In some embodiments, each of the first and second fixation means has a polygonal shape. Other shapes may also be possible. The fixation means 242, 244 may be fastened to one or more other parts of the electromagnetic device 200 via fasteners, such as screws.

By way of example, the cone radius R1 is in a range from 5 mm to 15 mm. The length L of the magnetic core 220 is in a range from 500 mm to 600 mm. The height H of the core tip 226 is in a range from 50 mm to 60 mm. The radius R2 of the magnetic core 220 is in a range from 30 mm to 40 mm. The length of the elongated sleeve 210 is in a range from 400 mm to 500 mm. The diameter of the elongated sleeve 210 is in a range from 50 mm to 60 mm.

By way of example, as illustrated in FIG. 2A, the center of a workspace is located at point O, which is the origin of a XOZ coordinate system. D refers to the distance between the core tip 226 (more specifically, the end of the core tip 226 proximate to the point O) and point O. In some embodiments, D=80 mm, and the magnetic flux density at point O can be in a range from 1 mT to 225 mT, and the magnetic field gradient at point O can be in a range from 0.1 T/m to 15 T/m.

By way of example, both the elongated sleeve 210 and the magnetic core 220 includes a material capable of being magnetized. For example, each may include a paramagnetic material that can be magnetized and induced by an external applied magnetic field. For example, each may include DT4E material, low carbon steel (1008 steel, 1010 steel), pure iron, or cast iron, or the like.

Figure 3A:
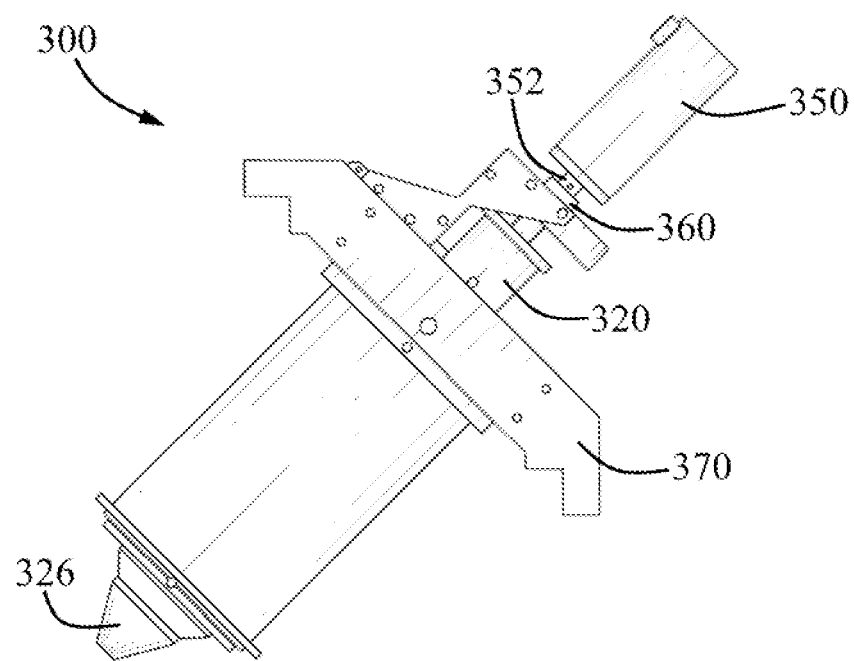
FIG. 3A illustrates an electromagnetic device with actuation means according to certain embodiments of the present invention.
Figure 3B:
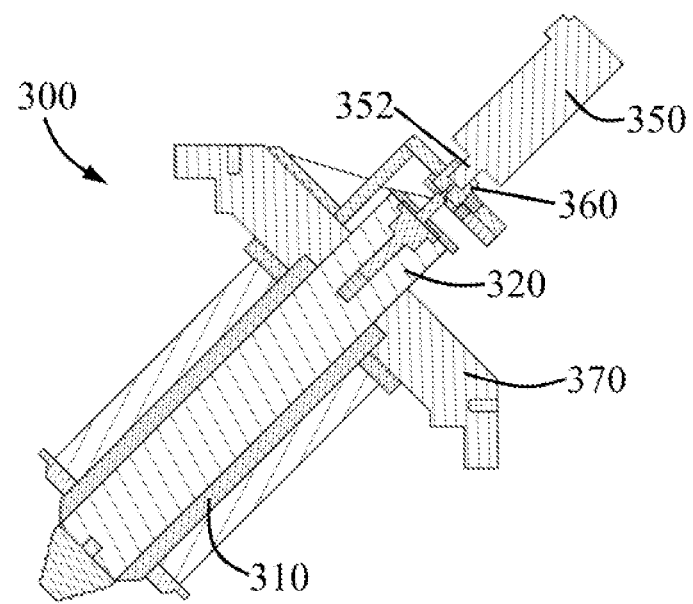
FIG. 3B is a cross-sectional view of the electromagnetic device of FIG. 3A, where the electromagnetic device is substantially symmetric relative to the cross section as illustrated in FIG. 3B.

FIGS. 3A-3B illustrates an electromagnetic device 300 according to certain embodiments of the present invention. The electromagnetic device 300, for example, can be a specific implementation of electromagnetic device 102 or 104 with reference to FIG. 1.

Compared with the electromagnetic device 200, the electromagnetic device 300 additionally includes actuation means for actuating a relative movement between the magnetic core 320 and the elongated sleeve 310 of the electromagnetic device 300 such that the workspace can be modified or adjusted.

By way of example and as illustrated, the actuation means includes a motor 350, such as a servo motor, that is coupled to one end (such as the second end) of the magnetic core 320 via a connector 360. Specifically, one end of the connector 360 connects to the magnetic core 320, while the other end of the connector 360 connects to a lead screw shaft 352. The motor 350 can be electrically powered so as to drive the lead screw shaft 352. The output of the lead screw shaft 352, via the connector 360, drives the magnetic core 320 to move linearly relative to the elongated sleeve 310.

As the core tip 326 is located on the boundary of the workspace as defined, linear motion of the magnetic core 320 will change location of the core tip 326, thereby modifying size of the workspace. In some embodiments, the magnetic core is allowed to realize a linear movement in a range from 50 mm to 110 mm towards the center of the workspace, such as 50 mm, 60 mm, 80 mm, 90 mm, 110 mm, thereby significantly modifying size of the workspace, thereby meeting requirements for a wide range of industrial applications. In some other embodiments, the linear movement of the magnetic core may be smaller than 50 mm, such as 10 mm, 20 mm, 30 mm, or larger than 110 mm, such as 130 mm, 160 mm. For example, in some embodiments, the magnetic core is allowed to realize a linear movement in a range from 1 mm to 160 mm towards the center of the workspace. The changeable workspace facilitates a wider range of industrial applications, such as the clinical research and applications for both animal experiments and human trail experiments.

Optionally and as illustrated, a frame 370 is provided to improve coupling or mounting between the magnetic core 320 and the motor 350. The frame 370 provides an improved mounting structure for the electromagnetic device 300. The frame 370 may include or be formed of magnetic materials.

Figure 4A:
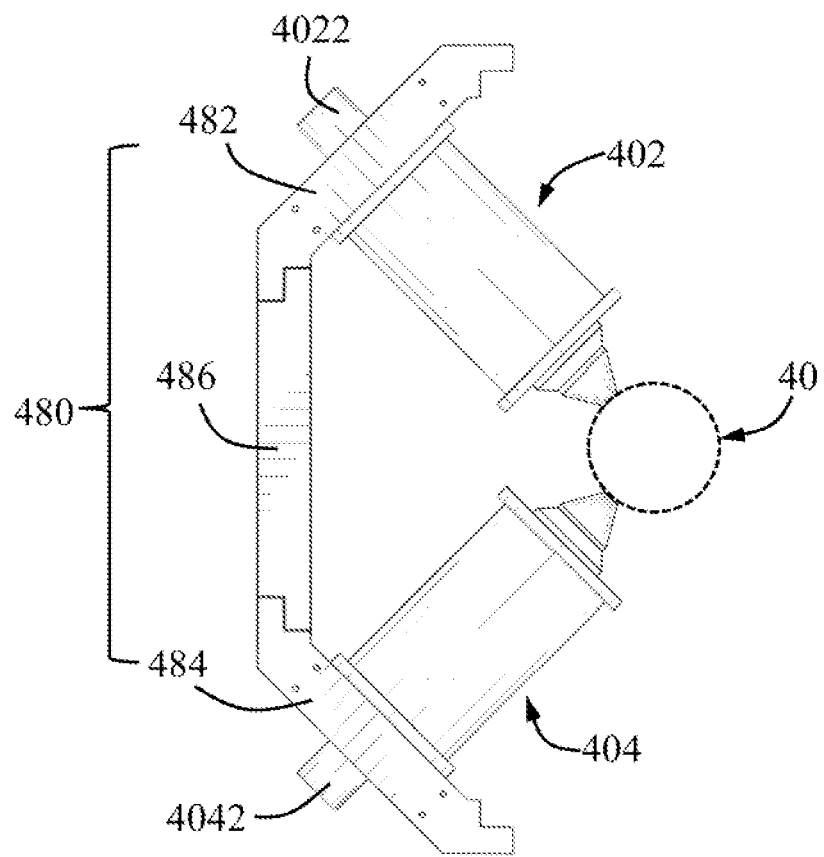
FIG. 4A illustrates two electromagnetic devices connected via a magnetic bridge according to certain embodiments of the present invention.

FIG. 4A illustrates two electromagnetic devices connected via a magnetic bridge according to certain embodiments of the present invention. Each electromagnetic device, for example, can be a specific implementation of one or more electromagnetic device as stated above with reference to one or more figures.

As illustrated, the two electromagnetic devices 402, 404 define a workspace 40. The electromagnetic device 402 includes a magnetic core 4022, while the electromagnetic device 404 includes a magnetic core 4042. Each of the magnetic cores 4022, 4042 can be movable towards or away from the workspace 40, thereby modifying the boundary of the workspace 40. In this way, the size and location (such as the center of workspace) can be tailored to various industrial contexts.

As illustrated, a magnetic bridge 480 connects the electromagnetic devices 402, 404. The magnetic bridge 480 includes a first section 482, a second section 484, and a middle section 486 disposed between the first section 482 and the second section 484. The magnetic bridge 480 is such configured that one end (such as the second end) of the magnetic core 4022 passes through the first section 482 and one end (such as the second end) of the magnetic core 4042 passes through the second section 484. The first, second, and middle sections may be formed separately and then are assembled to form the magnetic bridge. Alternatively, the first, second, and middle sections may be formed integrally as a single piece.

By way of example, the third section 486 has a surface 4862 opposite to the workspace 40. The surface 4862 as illustrated is of a rectangular shape with a length l and a width t. The length l extends along a direction from the second end of the magnetic core of the first electromagnetic device 402 towards the second end of the magnetic core of the second electromagnetic device 404. The length l is in a range from 50 cm to 60 cm, and the width t is in a range from 35 cm to 45 cm.

By way of example, the magnetic bridge 480 includes a material selected from a group consisting of DT4E, low carbon steel, pure iron, and cast iron. The magnetic bridge 480 contributes to enhancing the overall magnetic field strength and gradient generation, thereby facilitating manipulation of actuation subject.

Figure 5:
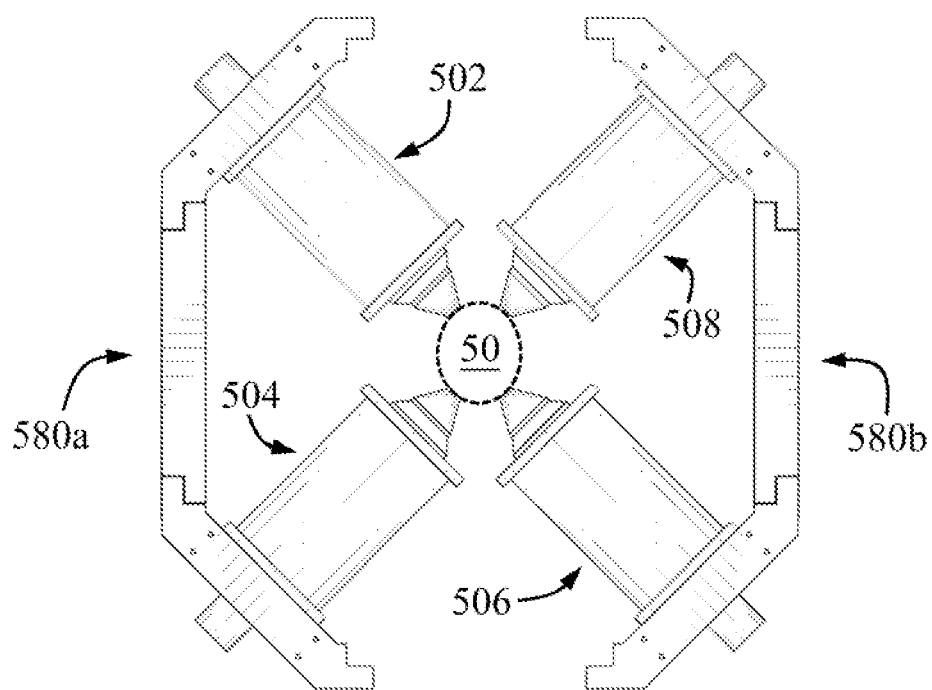
FIG. 5 illustrates four electromagnetic devices according to certain embodiments of the present invention.

FIG. 5 illustrates four electromagnetic devices 502, 504, 506, and 508 according to certain embodiments of the present invention. Each electromagnetic device, for example, can be a specific implementation of electromagnetic device 102, 104, 200, 300, 402, or 404 as stated above with reference to one or more figures.

As illustrated, the electromagnetic devices 502, 504, 506, and 508 define and surround a workspace 50. The electromagnetic devices 502, 504 are connected via a magnetic bridge 580a, while the electromagnetic devices 506, 508 are connected via a magnetic bridge 580b.

Figure 6A:
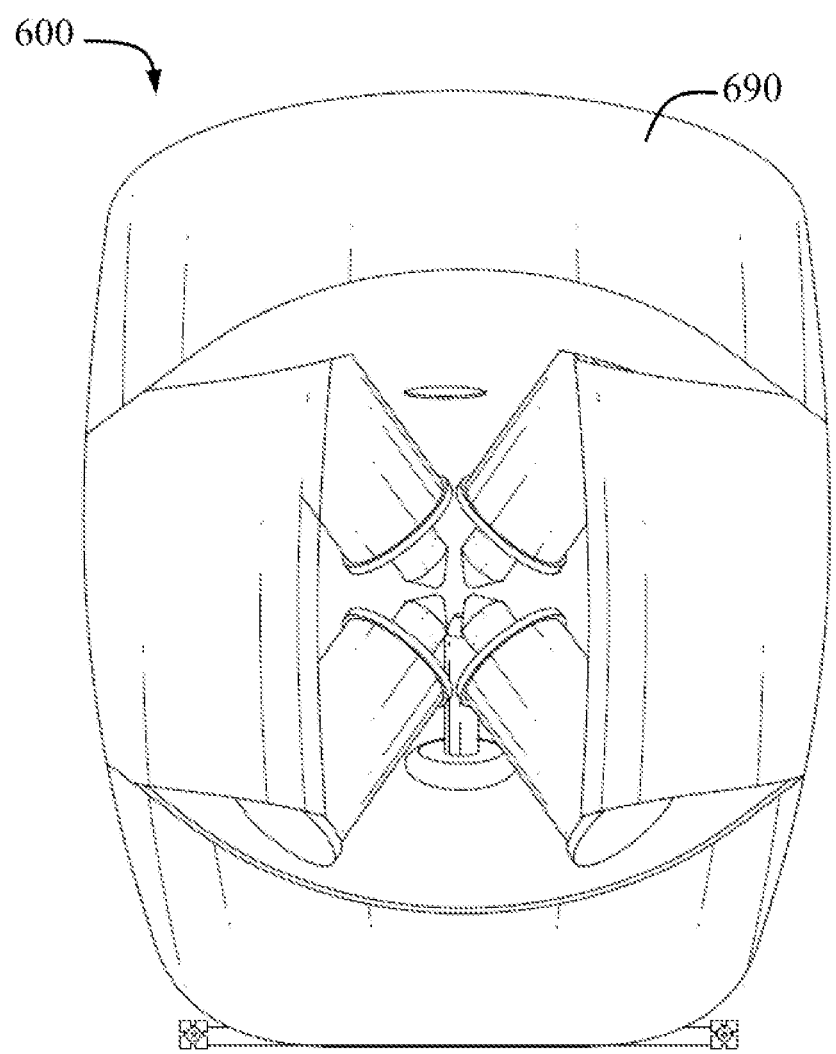
FIG. 6A illustrates an electromagnetic actuation system according to certain embodiments of the present invention.
Figure 6B:
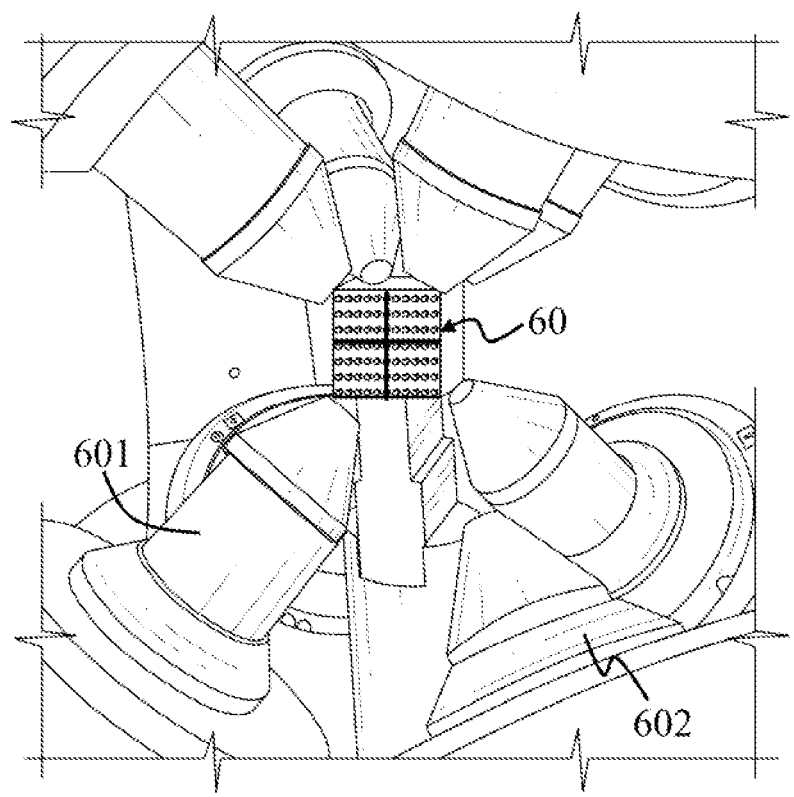
FIG. 6B illustrates a part of the electromagnetic actuation system of FIG. 6A and a workspace formed thereof, where a non-actuated magnetic core is shown.
Figure 6C:
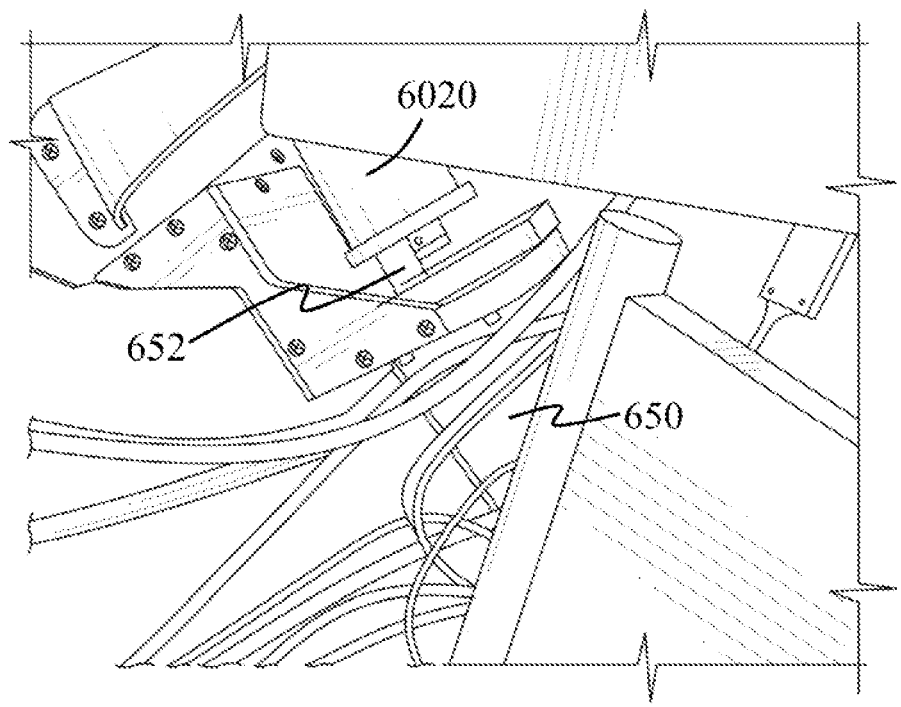
FIG. 6C illustrates an actuation means associated with a magnetic core in the electromagnetic actuation system of FIG. 6A.

FIGS. 6A-6C illustrate an electromagnetic actuation system 600 including a plurality of electromagnetic devices. Each can be, for example, a specific implementation of one or more electromagnetic devices as stated above with reference to one or more figures.

The number of electromagnetic devices as shown is for illustrating purpose only. Other number of electromagnetic devices is possible according to practical needs. The electromagnetic devices are housed within a casing or housing 690. The casing 690 may be made of proper materials, such as ABS engineering plastics.

By way of example, the magnetic core of one or more of the electromagnetic devices can be linearly adjusted such that the workspace 60 formed can be adjustable. For example, as illustrated in FIG. 6B, the core tip of electromagnetic device 601 is in an actuated state and closer to the center of the workspace 60, while the core tip of electromagnetic device 602 is in an unactuated state and further away from the center of the workspace 60. FIG. 6C shows a motor 650 that is coupled to the magnetic core 6020 of one electromagnetic device via a lead screw shaft 652.

Figure 7:
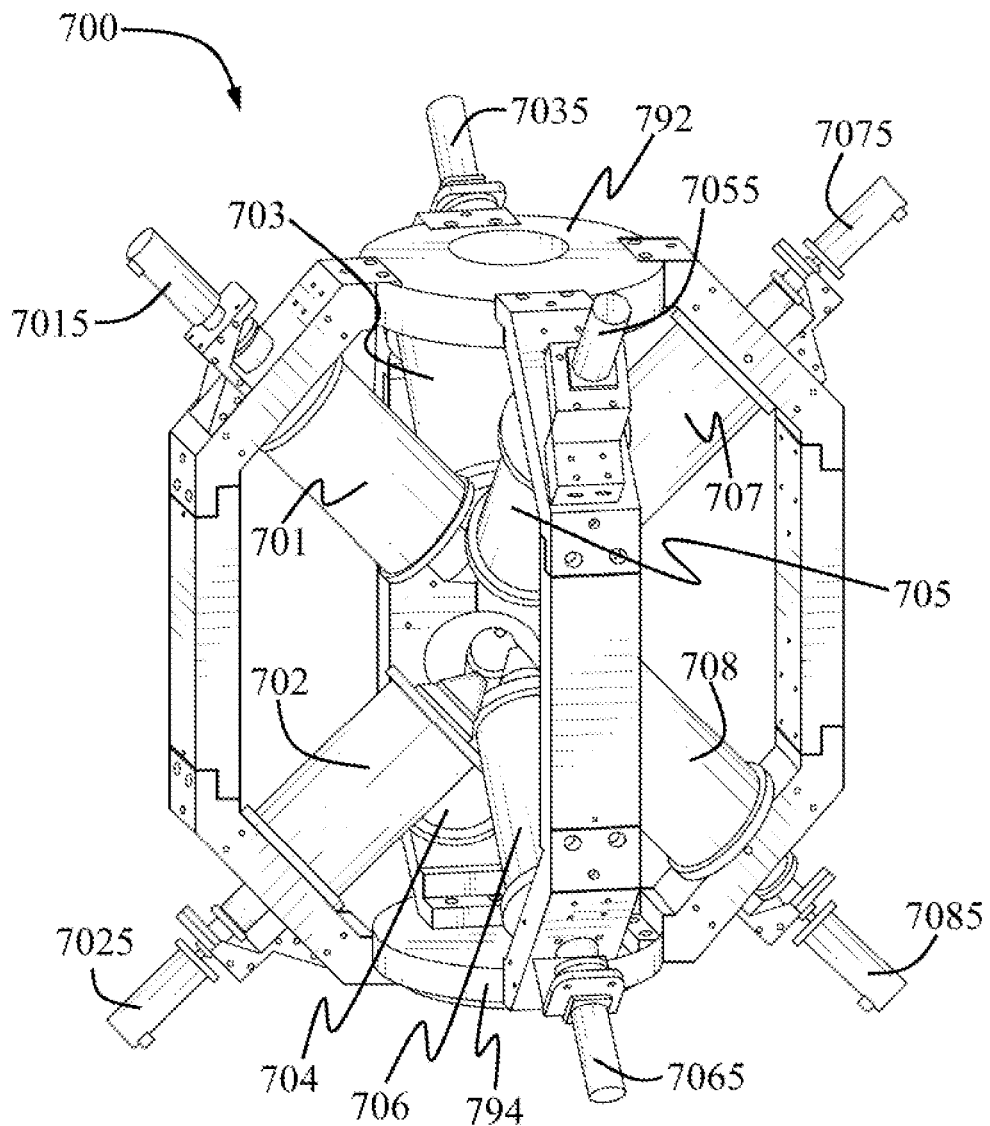
FIG. 7 illustrates an electromagnetic actuation system according to certain embodiments of the present invention where the casing of the system is removed.

FIG. 7 illustrates an electromagnetic actuation system 700 according to certain embodiments of the present invention. For clarity, the casing and some components, such as electrical wires, power supply, are not shown. The system 700 includes eight electromagnetic devices 701, 702, 703, 704, 705, 706, 707, and 708. Each electromagnetic device, for example, can be a specific implementation of one or more electromagnetic devices as stated above with reference to one or more figures.

Each of the electromagnetic devices 701, 702, 703, 704, 705, 706, 707, and 708 includes an actuation means, such as a motor system, which, except for the electromagnetic device 704, are labelled as 7015, 7025, 7035, 7055, 7065, 7075, and 7085 respectively. The actuation means for the electromagnetic device 704 is not shown.

As illustrated, the system 700 includes a magnetic frame. The magnetic frame includes a top base 792, a bottom base 794, and a plurality of magnetic bridges bridging the top base 792 and the bottom base 794. The magnetic frame includes or is made of one or more magnetic materials. The magnetic frame contributes to improved system performance because of the enhanced overall magnetic field strength and gradient generation in the workspace.

As illustrated, the system 700 is configured as a cage structure, which is compact and effective to confine magnetic field within the workspace, thereby beneficial to driving of actuation subject. System configuration other than cage structure may be possible in some other embodiments.

Figure 8:
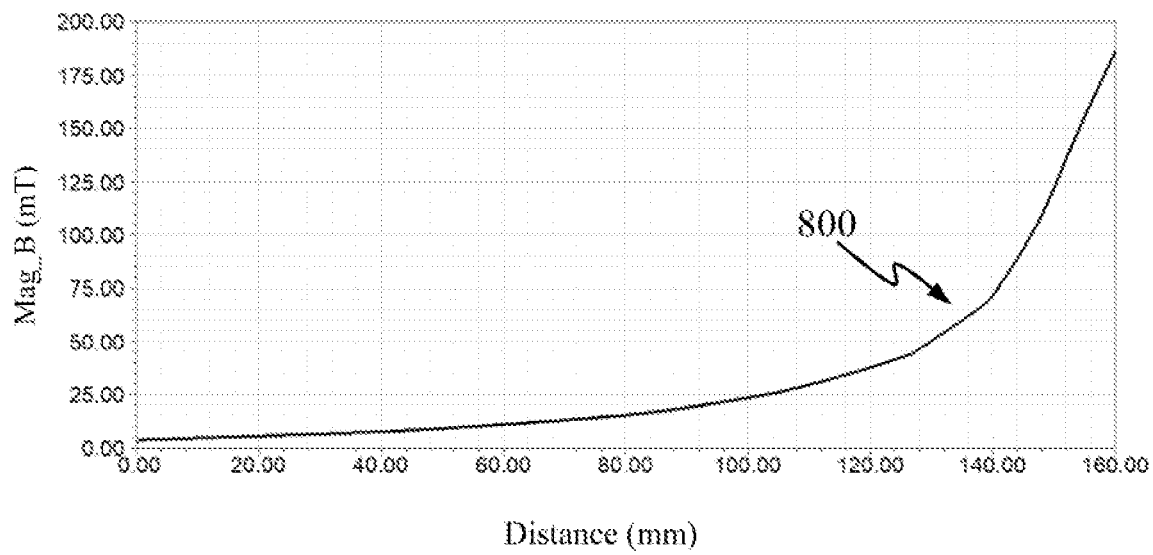
FIG. 8 shows magnetic flux density vs distance relationship in a workspace generated by a single electromagnetic device according to certain embodiments of the present invention.

FIG. 8 shows magnetic flux density (also called magnetic B-field strength) vs distance relationship in a workspace generated by a single electromagnetic device according to certain embodiments of the present invention.

The electromagnetic device may be one of the electromagnetic devices as stated above with reference to one or more figures. The relationship, i.e. the curve 800, may be obtained by simulation using a proper software, such as Ansys Electronic Desktop 2017 in the present embodiment. In the present embodiment, finite element analysis is used, despite other methods may be employed in some other embodiments.

In the present embodiment, the electromagnetic actuation system takes the electromagnetic actuation system 700 with reference to FIG. 7, which includes eight electromagnetic devices. The magnetic cores and elongated sleeves of the electromagnetic devices are made of DT4E material, which exhibits good electromagnetic properties, low coercivity, high-saturation magnetic induction, and absence of magnetic aging problem. The turn number of each electric coil is 1400. The electric coil is implemented as copper wire. The diameter of the enameled copper wire for windings is 3 mm and each electrical coil has a total resistance of 1.77Ω. The operating current of the system is derived from eight programmable power supplies with 1600 W power rating for each, which can provide a stable maximum current of 20 A for each electric coil.

In the present embodiment, only a single electromagnetic device is energized. Optimized values for geometric parameters for its magnetic core are identified to maximize the magnetic performance including magnetic flux density and gradient performance.

In FIG. 8, the distance refers to a distance from the cone tip of the energized magnetic core. The origin in the horizontal axis, i.e., point (0.00), refers to the point of the energized magnetic core that is nearest to the workspace. The point (160.00) corresponds to position of a magnetic core opposite to the energized magnetic core. That is, this magnetic core and the energized magnetic core are on opposite sides of the workspace. The point (80.00) refers to the center of the workspace. That is, the size of the workspace is 160 mm.

When the magnetic core (such as an iron core) is in the saturation state, its radius is proportional to the distance from its center point to the concerned position along its normal line in space. This proportional relationship directly affects the magnetic field strength generated by the magnetic core. The geometric parameters of core structure can be optimized based on the analysis results.

As a result, under the optimized condition, the radius of the magnetic core is 38 mm. The length of the magnetic core is 537 mm. The cone radius of the magnetic core is 10 mm. The height of the core tip is 58 mm. The magnetic flux density of the single magnetic coil can generate at 80 mm away from the cone tip is around 15.6 mT with 20 A current excitation. These numeral values are for illustrating purpose and may vary depending on specific system designs.

With reference to Table 1 below, the magnetic field gradient is obtained by calculating the difference of magnetic flux density at a measuring point with a spatial distance ±0.02 mm. The magnetic field gradient at 80 mm is around 0.27 T/m with current excitation of 20 A. The measuring point refers to a distance relative to the origin. For example, the distance of Point 3 relative to the origin is 80 mm, which is the center of the workspace.

TABLE 1

Magnetic flux density and gradient with single coil actuation at current excitation of 20A. The column Mag_B represents magnetic flux density, while the column Del_B represents magnetic field gradient.

| Point | Measuring Point (mm) | Position A (mm) | Position B (mm) | Distance difference (mm) | Mag_B(mT) at measuring point | Del_B(T/m) at measuring point |
|---|---|---|---|---|---|---|
| 1 | 60 | 59.9 | 60.1 | 0.02 | 11.3 | 0.19 |
| 2 | 70 | 69.9 | 70.1 | 0.02 | 13.3 | 0.22 |
| 3 | 80 | 79.9 | 80.1 | 0.02 | 15.6 | 0.27 |
| 4 | 90 | 89.9 | 90.1 | 0.02 | 19.1 | 0.39 |
| 5 | 100 | 99.9 | 100.1 | 0.02 | 23.6 | 0.49 |

Figure 9A:
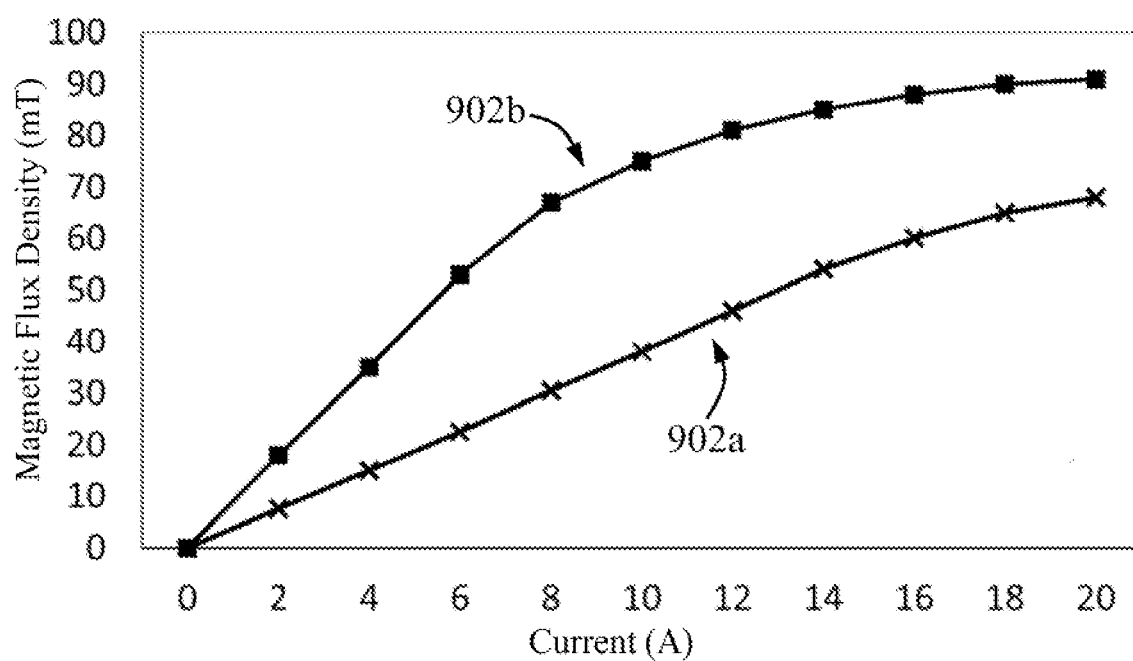
FIG. 9A shows comparison of magnetic flux density vs current relationship in a workspace generated by an electromagnetic device with or without magnetic bridge according to certain embodiments of the present invention.

FIGS. 9A-9B show comparison of magnetic flux density vs current relationship, and of magnetic field gradient vs current relationship, respectively, in a workspace generated by an electromagnetic device with or without magnetic bridge according to certain embodiments of the present invention.

Figure 4B:
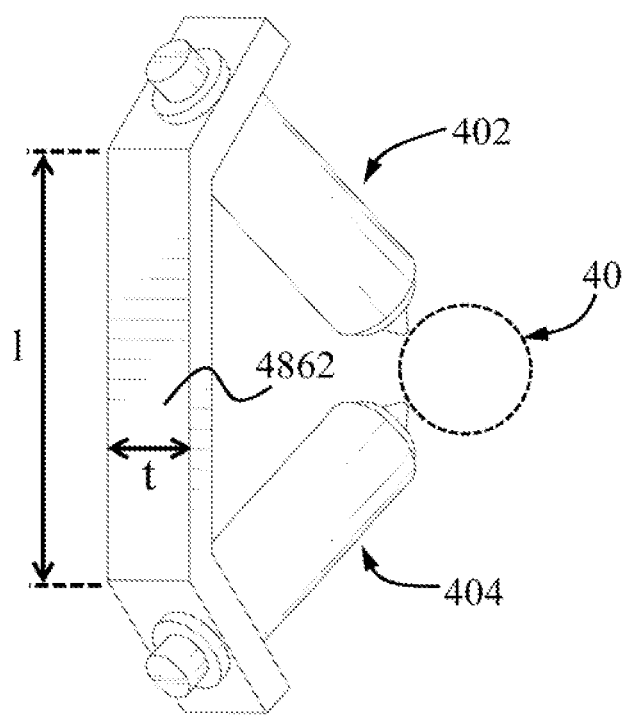
FIG. 4B illustrates the two electromagnetic devices of FIG. 4A from another perspective such that a surface of the magnetic bridge with a rectangular shape is visible.

For illustrating purpose, the workspace is set as 160 mm. Only a single electromagnetic device is energized. The abscissa refers to actuation current or energizing current that energizes the electromagnetic device. Curves 902a and 904a refer to magnetic flux density and magnetic field gradient respectively under different actuation current without magnetic bridge. Curves 902b and 904b refer to magnetic flux density and magnetic field gradient respectively under different actuation current with magnetic bridge, where the magnetic bridge has a configuration similar to that with reference to FIGS. 4A-4B. The length l is 636 mm, and the width t is 160 mm. The geometric parameters for the magnetic core are same as those optimized values as described above with reference to FIG. 8.

As shown for curves 902a and 904a, under current of 20 A and absent magnetic bridge, the magnetic flux density actuated is around 68.8 mT and the magnetic field gradient is around 4 T/m. When a magnetic bridge is included, the magnetic flux density and gradient increase to around 93 mT and 5.3 T/m respectively. The magnetic bridge provides a lower magnetic resistance when compared to air. It provides a circuit or path for field flux line to travel from coil to coil. As further shown, the soft iron core becomes saturated at around 6 A. Despite the approximate linearity of the magnetic flux density and gradient, connecting two electromagnetic devices (or more specifically, connecting two magnetic cores) with a magnetic bridge can increase magnetic flux density generation by around 35%, and increase magnetic gradient performance by around 32.5%.

FIG. 10 illustrates a method of generating a gradient magnetic field in a workspace according to certain embodiments of the present invention. The method may be applied to or in connection with one or more devices or systems as described above with reference to one or more figures, such as FIGS. 6A-7. The method provides gradient-enhanced magnetic field that improves manipulation of actuation subject in the workspace so as to perform certain tasks in one or more industrial applications.

Block 1002 states grouping one or more pairs of electromagnetic devices into one or more groups. A pair of electromagnetic devices may be two electromagnetic devices adjacent to each other, or away from each other, or opposite to each other, or having other physical or electrical relationship per one or more certain criteria. A pair of electromagnetic devices may be grouped as one single group. Two or more pairs may be grouped together.

Block 1004 states forming activation strategies for the one or more groups. The activation strategies include selections, such as which groups are to be activated, the value of energizing current for each electric coil, direction of the energizing current, and distance between each magnetic core and the center of the workspace. Different groups may be energized differently, such as with current of different magnitude or direction or under different energizing frequency. In some embodiments, certain groups may not be energized for a period of time or under specified time intervals.

Block 1006 states generating the gradient-enhanced magnetic field by adopting the activation strategies for the one or more groups. By way of example, magnetic field gradient at the center of the workspace may be adjusted by linearly changing the distance between the magnetic cores of one or more of the electromagnetic devices and the center of the workspace. For example, the distance can be changed by linearly moving the magnetic cores under the driving force of an electric motor, such as a servo motor.

In some embodiments, a first group of electromagnetic devices is energized using a first energizing current value in a first direction (such as clockwise), and a second group of electromagnetic devices is energized using the first energizing current value in a second direction (such as counterclockwise) opposite to the first direction. An optimized magnetic field gradient at the center of the workspace is obtained by adjusting geometric parameters for the one or more pairs of electromagnetic devices, such as by adjusting geometric parameters for each magnetic core.

A direction of energizing current refers to direction of current flow in an electric coil when looking at the electric coil from a predetermined perspective by a person. In the present description, to decide the direction (clockwise or counterclockwise) of energizing current, the person is standing at one end of the magnetic core distal to the workspace in such a way that his or her eyes are looking at the center of workspace.

In some embodiments, a first group of electromagnetic devices is energized by using a first energizing current value in a first direction. A second group of electromagnetic devices is energized by using the first energizing current value in a second direction opposite to the first direction. A third group of electromagnetic devices is energized by using a second energizing current value in the first direction. A fourth group of electromagnetic devices is energized by using the second energizing current value in the second direction. As a result, a local minimum point of magnetic flux density in the workspace is formed. An optimized magnetic field gradient at the center of the workspace can be obtained by adjusting location of the local minimum point.

In some embodiments, a first group of electromagnetic devices and a second group of electromagnetic devices are energized by using a first energizing current value in a first direction. A third group of electromagnetic devices and a fourth group of electromagnetic devices are energized by using the first energizing current value in a second direction opposite to the first direction. A local minimum point of magnetic flux density in the workspace is formed, such that the magnetic field is zero at the local minimum point. An optimized magnetic field gradient at the center of the workspace can be obtained by adjusting location of the local minimum point.

In some other embodiments, the electromagnetic devices can be divided into more than four groups. Other activation strategies may be implemented. The methods as exemplified herein provides flexibility to adapt to industrial needs and also achieve gradient-enhanced magnetic field that improves driving of actuation subject.

FIGS. 11A-13C illustrate some examples as to actuating one or more electromagnetic actuation systems under various modes. The electromagnetic actuation systems are taken as that with reference to FIG. 7. The optimized geometric parameters of core structure for each magnetic core are as follows. The radius of the magnetic core is 38 mm. The length of the magnetic core is 537 mm. The cone radius of the magnetic core is 10 mm. The height of the core tip is 58 mm. For each magnetic bridge, the optimized parameters are that the length l is 636 mm, and the width t is 160 mm. The software Ansys Electronic Desktop 2017 is used. Finite element analysis is employed.

Figure 11A:
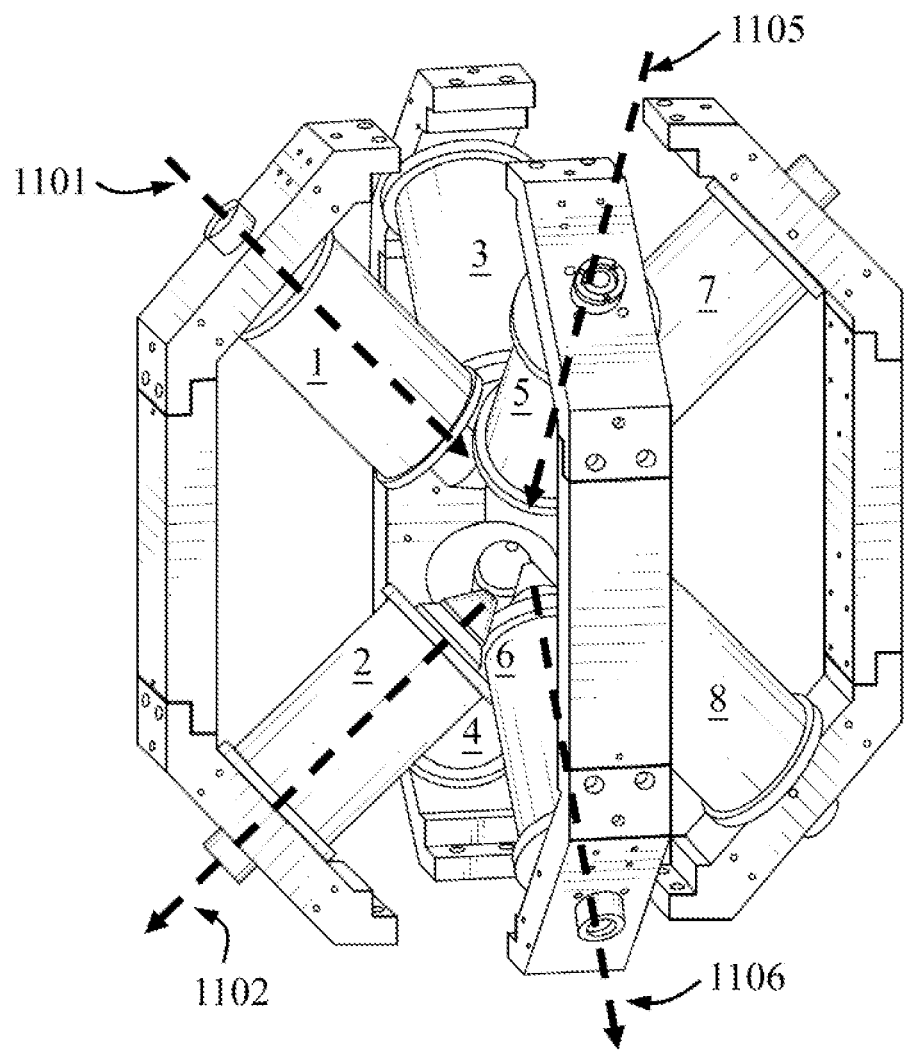
FIG. 11A illustrates an electromagnetic actuation system with eight electromagnetic devices energized under a first magnetic actuation mode according to certain embodiments of the present invention.
Figure 11B:
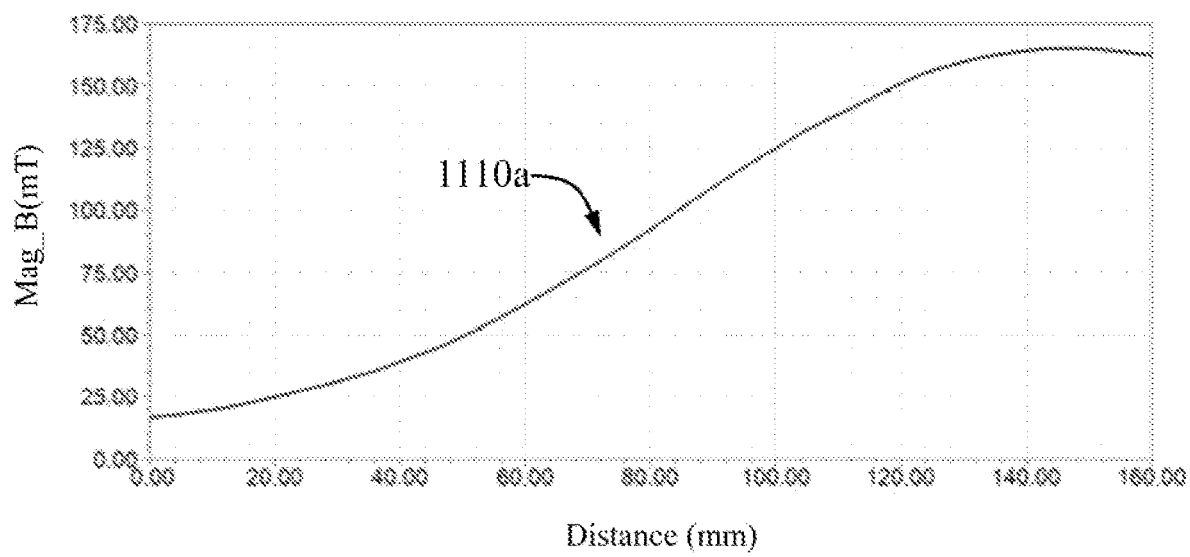
FIG. 11B shows magnetic flux density vs distance relationship for the electromagnetic actuation system of FIG. 11A where the size of workspace is 160 mm.
Figure 11C:
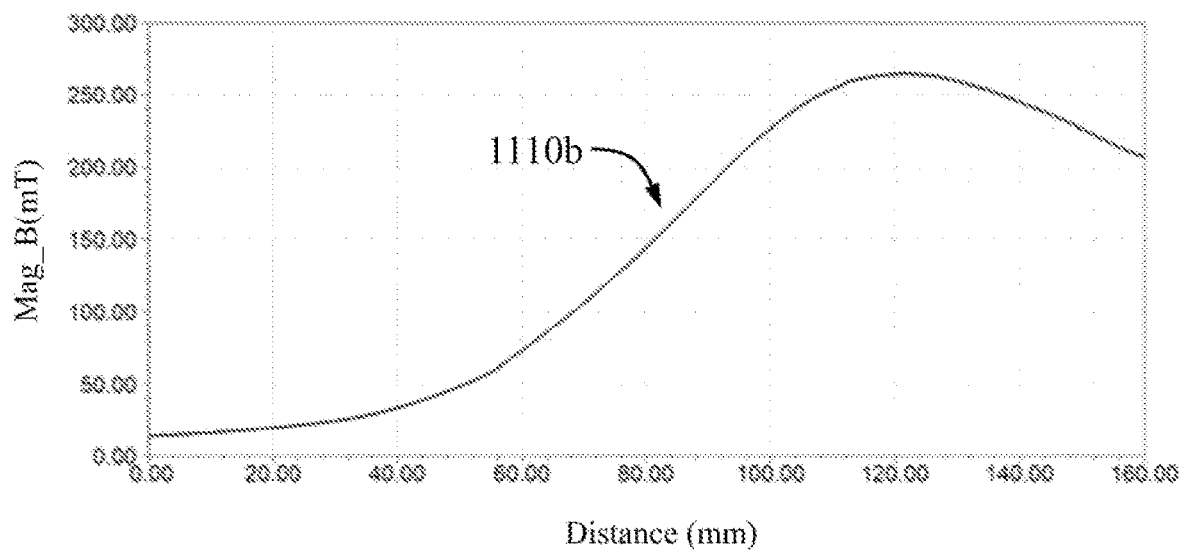
FIG. 11C shows magnetic flux density vs distance relationship for the electromagnetic actuation system of FIG. 11A where the size of workspace is 100 mm.

FIG. 11A illustrates an electromagnetic actuation system with eight electromagnetic devices, energized under a first magnetic actuation mode according to certain embodiments of the present invention. FIG. 11B shows magnetic flux density vs distance relationship for the electromagnetic actuation system of FIG. 11A where the size of workspace is 160 mm. FIG. 11C shows magnetic flux density vs distance relationship where the size of workspace is 100 mm. The vertical axis represents magnetic flux density, while the horizontal axis represents distance.

For ease of description, the electromagnetic devices are labelled using digits 1, 2, 3, 4, 5, 6, 7, 8. A electromagnetic device is referred by using the word "coil" followed by the respective digit. This is also applicable to description below with reference to FIG. 12A or FIG. 13A. In the present description, statements such as an electric coil or magnetic coil or coil being energized with or under a current, an electromagnetic device being energized with or under a current, and a magnetic core being energized with or under a current, or the like, have same meanings.

As illustrated, four coils are energized. Coil 1 and 5 are energized with 20 A in clockwise direction while coil 2 and 6 are energized with 20 A in counterclockwise direction. The representative magnetic field line 1101 (as indicated by dashed arrow) of coil 1 and the magnetic field line 1105 of coil 5 are pointing into the workspace center, while the magnetic field line 1102 of coil 2 and the magnetic field line 1106 of coil 6 are leaving the workspace center.

Figure 12A:
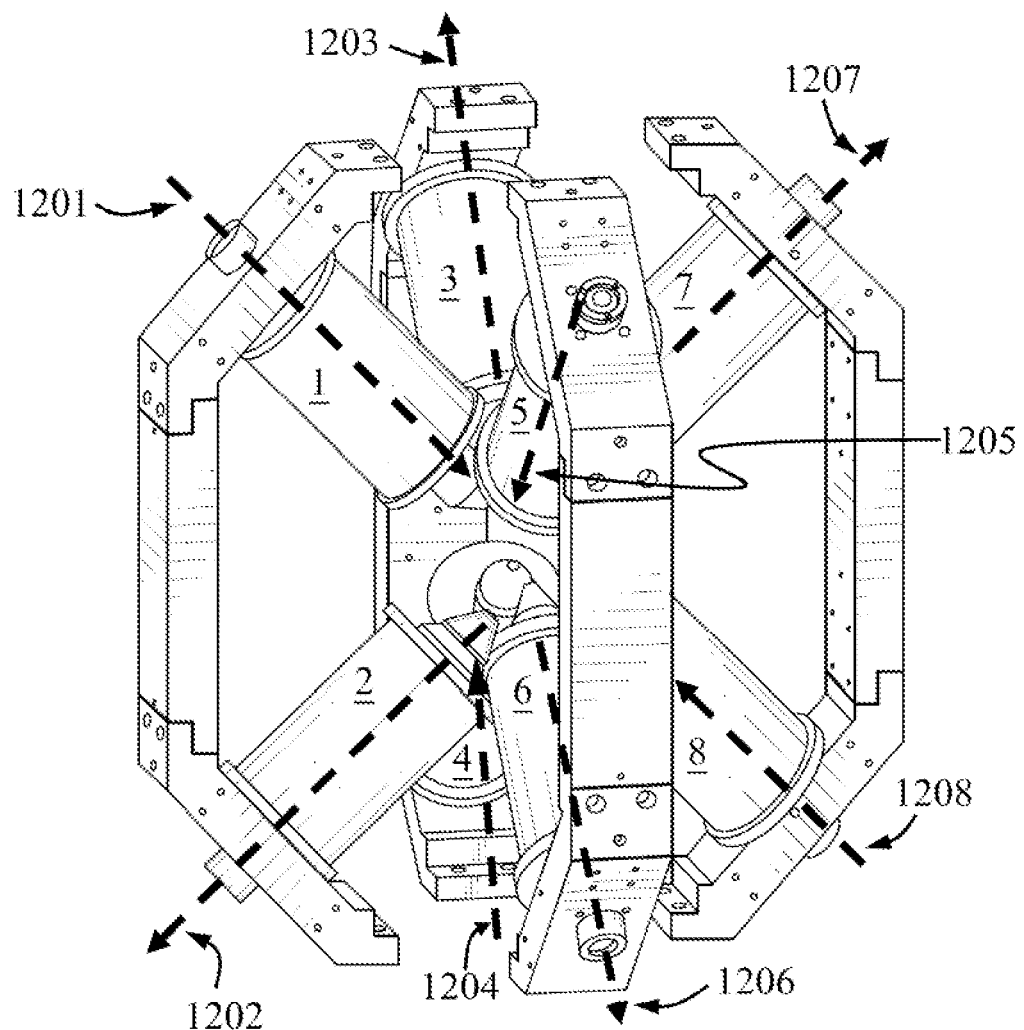
FIG. 12A illustrates an electromagnetic actuation system with eight electromagnetic devices energized under a second magnetic actuation mode according to certain embodiments of the present invention.

As illustrated by curves 1110a and 1110b, for the maximum performance, the magnetic flux density and gradient for the workspace are around 125 mT at point 5 and 1.63 T/m at point 4 respectively when the workspace is of 160 mm in size. The magnetic flux density and gradient are around 227 mT at point 5 and 4.4 T/m at point 4 when the workspace is of 100 mm in size. The data are shown in Table 2.

current of 20 A in counterclockwise direction. Coil 4 and 8 are energized with current of 10 A in clockwise direction. Coil 3 and 7 are energized with current of 10 A in counterclockwise direction. Representative magnetic field lines 1201, 1202, 1203, 1204, 1205, 1206, 1207, and 1208 are shown in FIG. 12A, where arrows indicate directions of the magnetic field lines.

Figure 12B:
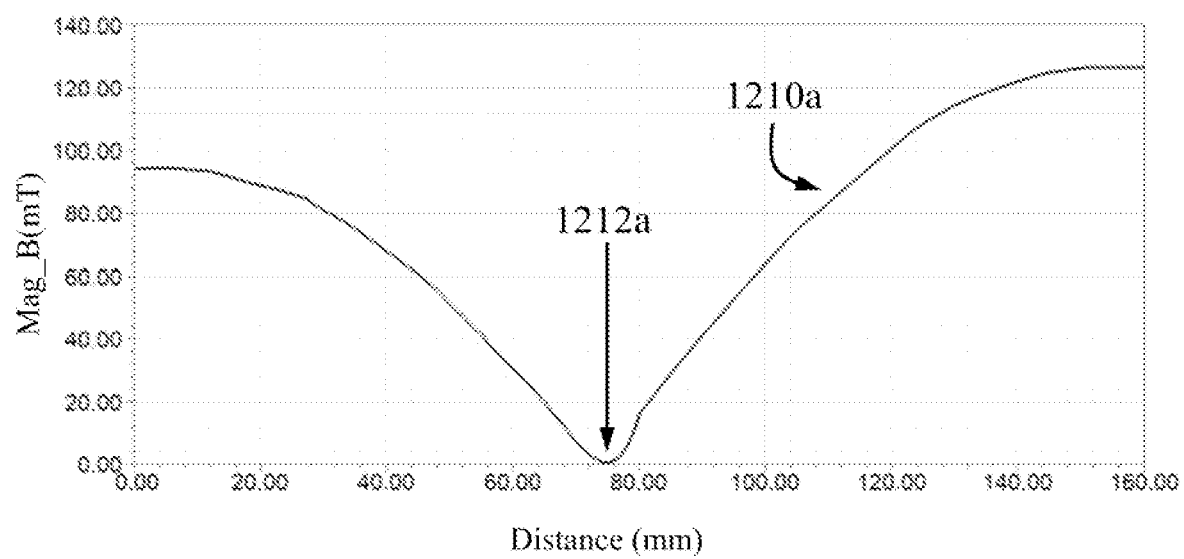
FIG. 12B shows magnetic flux density vs distance relationship for the electromagnetic actuation system of FIG. 12A where the size of workspace is 160 mm.
Figure 12C:
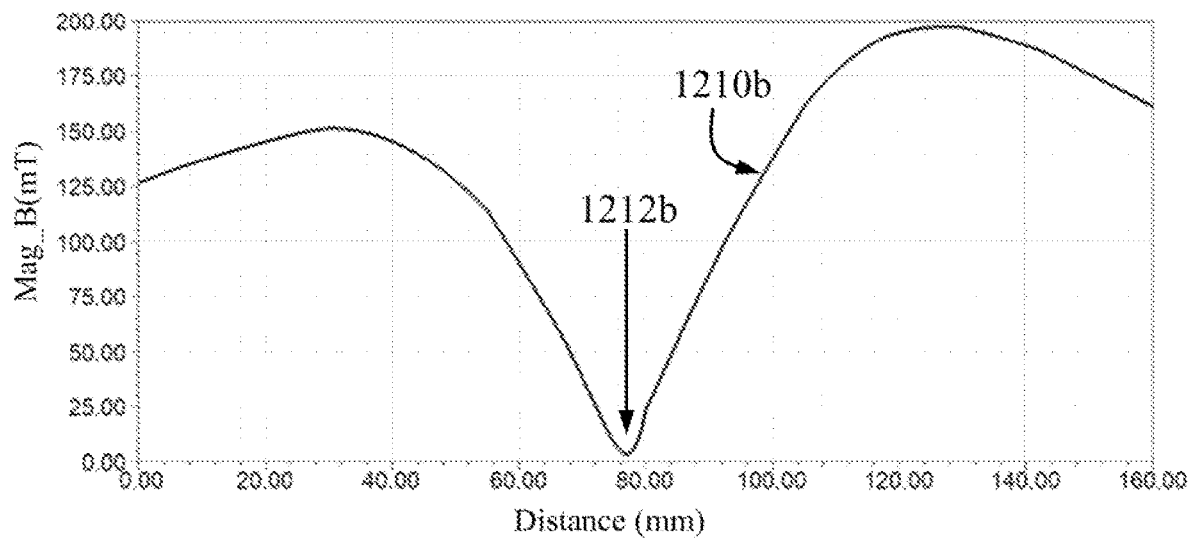
FIG. 12C shows magnetic flux density vs distance relationship for the electromagnetic actuation system of FIG. 12A where the size of workspace is 100 mm.

As illustrated in FIGS. 12B and 12C, a local minimum point of magnetic flux density is formed in the workspace. Curve 1210a is shown to have a local minimum point 1212a in the workspace of 160 mm. Curve 1210b is shown to have a local minimum point 1212b in the workspace of 100 mm. By adjusting the local minimum point, the gradient performance can be enhanced, thereby improving driving force of actuation subject under the magnetic field in the workspace. For example, the local minimum point may be controlled by energizing the coils differently. By way of example, position of local minimum point may be modified or adjusted by adjusting the direction and magnitude of excitation current in one or more coils. Different current (direction and/or magnitude) in the coils may create magnetic field with different direction and/or magnitude. The local minimum point takes place where the magnetic field substantially cancels each other to create a local 0 mT point (i.e., local zero-field point). The change of magnetic flux density near the local minimum point within a specified distance interval (such as 0.02 mm) (i.e., the change rate) is larger than that further away from the local minimum point. Therefore, the

TABLE 2

Magnetic flux density and magnetic field gradient for workspace of 160 mm and 100 mm respectively under the first magnetic actuation mode with reference to FIG. 11A. The column Mag_B represents magnetic flux density, while the column Del_B represents magnetic field gradient.

| Point | Measuring point (mm) | Point A (mm) | Point B (mm) | Distance difference (mm) | Mag_B (mT) at measuring point | Del_B (T/m) at measuring point |
|---|---|---|---|---|---|---|
| Size of workspace = 100 mm | | | | | | |
| 1 | 60 | 59.9 | 60.1 | 0.02 | 73.5 | 3.1 |
| 2 | 70 | 69.9 | 70.1 | 0.02 | 106.12 | 3.57 |
| 3 | 80 | 79.9 | 80.1 | 0.02 | 144.78 | 4.038 |
| 4 | 90 | 89.9 | 90.1 | 0.02 | 186.83 | 4.448 |
| 5 | 100 | 99.9 | 100.1 | 0.02 | 227.34 | 3.401 |
| Size of workspace = 160 mm | | | | | | |
| 1 | 60 | 59.9 | 60.1 | 0.02 | 62.56 | 1.38 |
| 2 | 70 | 69.9 | 70.1 | 0.02 | 76.88 | 1.5 |
| 3 | 80 | 79.9 | 80.1 | 0.02 | 92.42 | 1.62 |
| 4 | 90 | 89.9 | 90.1 | 0.02 | 109.06 | 1.63 |
| 5 | 100 | 99.9 | 100.1 | 0.02 | 125.05 | 1.53 |

FIG. 12A illustrate an electromagnetic actuation system with eight electromagnetic devices energized under a second magnetic actuation mode according to certain embodiments of the present invention. FIG. 12B shows magnetic flux density vs distance relationship for the electromagnetic actuation system of FIG. 12A where the size of workspace is 160 mm. FIG. 12C shows magnetic flux density vs distance relationship where the size of workspace is 100 mm. The vertical axis represents magnetic flux density, while the horizontal axis represents distance.

As illustrated, coil 1 and 5 are energized with current of 20 A in clockwise direction. Coil 2 and 6 are energized with magnetic field gradient is larger near the local minimum point. Further, as stated above, the geometric parameters of magnetic core can be optimized to improve or optimize the overall performance of the magnetic flux density and gradient generation.

As shown, the magnetic flux density and magnetic field gradient under this mode is around 64.2 mT at point 5 and 6.7 T/m at point 3 respectively for the workspace with a size of 160 mm. The magnetic flux density and magnetic field gradient under this mode is around 137 mT at point 5 and 14.8 T/m at point 3 respectively for the workspace with a size of 100 mm. The data are shown in Table 3.

TABLE 3

Magnetic flux density and magnetic field gradient for workspace of 160 mm and 100 mm respectively under the second magnetic actuation mode with reference to FIG. 12A. The column Mag_B represents magnetic flux density, while the column Del_B represents magnetic field gradient.

| Point | Measuring point (mm) | Point A (mm) | Point B (mm) | Distance difference (mm) | Mag_B (mT) at measuring point | Del_B (T/m) at measuring point |
|---|---|---|---|---|---|---|
| Size of workspace = 100 mm | | | | | | |
| 1 | 60 | 59.9 | 60.1 | 0.02 | 90.17 | −4.80 |
| 2 | 70 | 69.9 | 70.1 | 0.02 | 38.2 | −5.82 |
| 3 | 80 | 79.9 | 80.1 | 0.02 | 23.52 | 14.75 |
| 4 | 90 | 89.9 | 90.1 | 0.02 | 84.93 | 6.04 |
| 5 | 100 | 99.9 | 100.1 | 0.02 | 137.99 | 4.88 |
| Size of workspace = 160 mm | | | | | | |
| 1 | 60 | 59.9 | 60.1 | 0.02 | 30.17 | −1.93 |
| 2 | 70 | 69.9 | 70.1 | 0.02 | 7.52 | −2.31 |
| 3 | 80 | 79.9 | 80.1 | 0.02 | 16.43 | 6.77 |
| 4 | 90 | 89.9 | 90.1 | 0.02 | 41.57 | 2.38 |
| 5 | 100 | 99.9 | 100.1 | 0.02 | 64.23 | 2.18 |

Figure 13A:
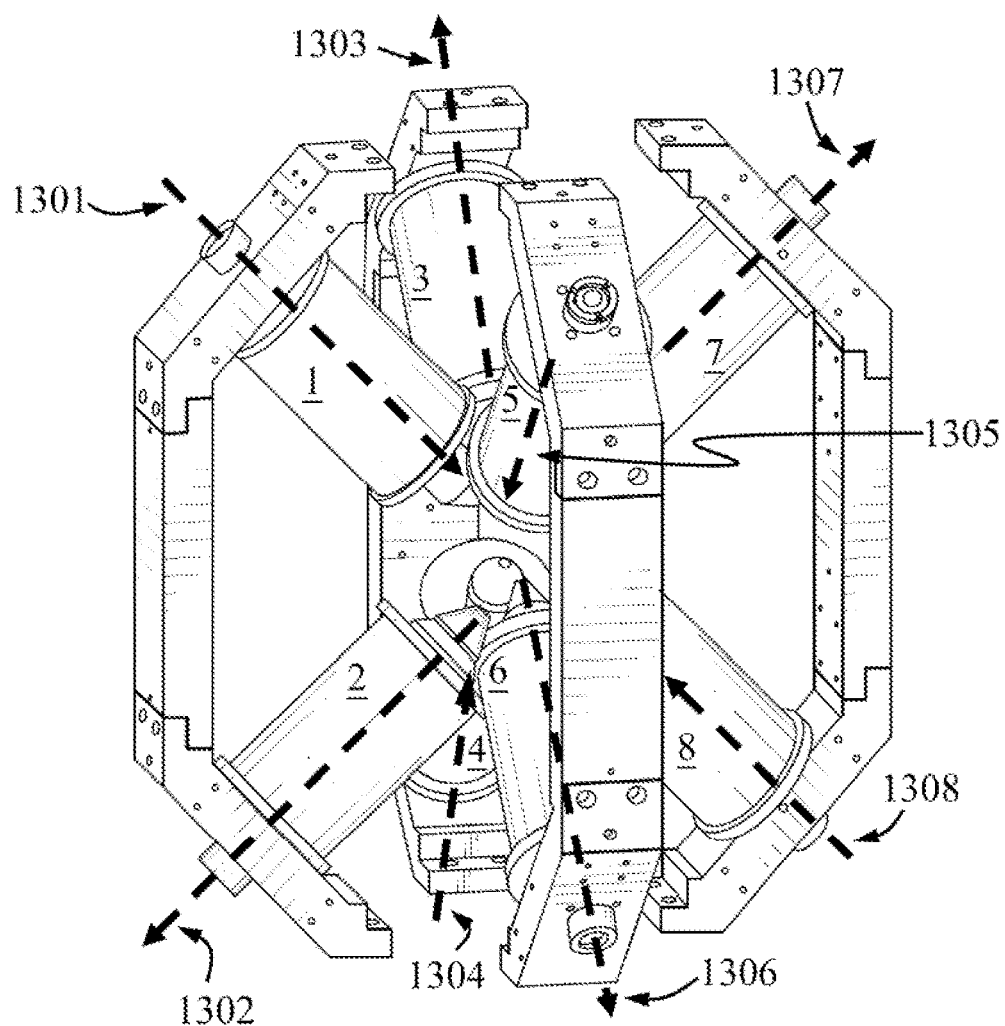
FIG. 13A illustrates an electromagnetic actuation system with eight electromagnetic devices energized under a third magnetic actuation mode according to certain embodiments of the present invention.
Figure 13B:
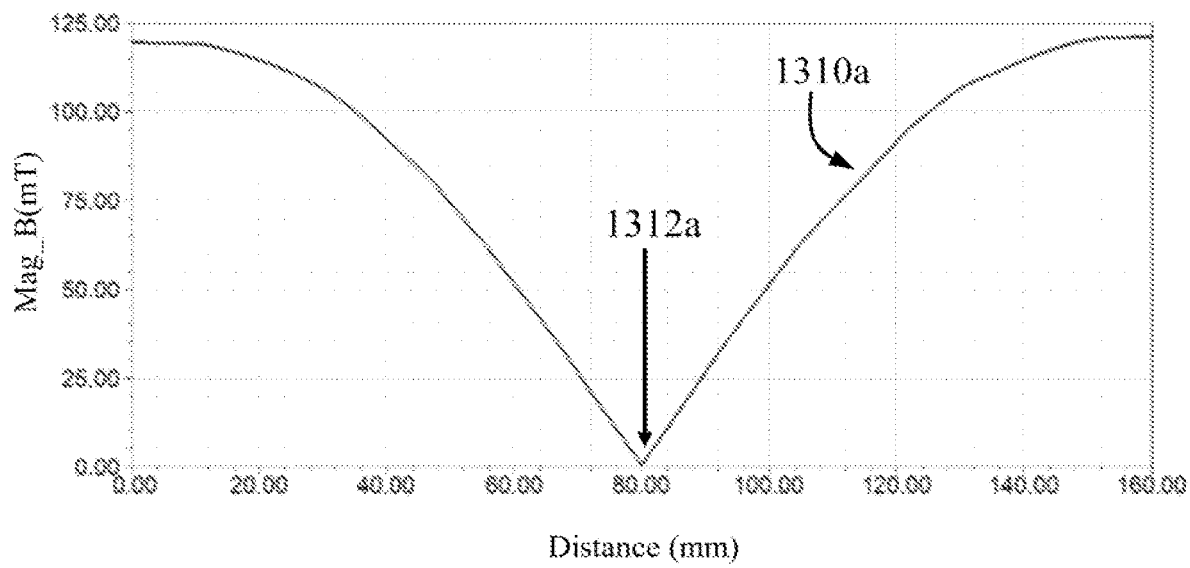
FIG. 13B shows magnetic flux density vs distance relationship for the electromagnetic actuation system of FIG. 13A where the size of workspace is 160 mm.
Figure 13C:
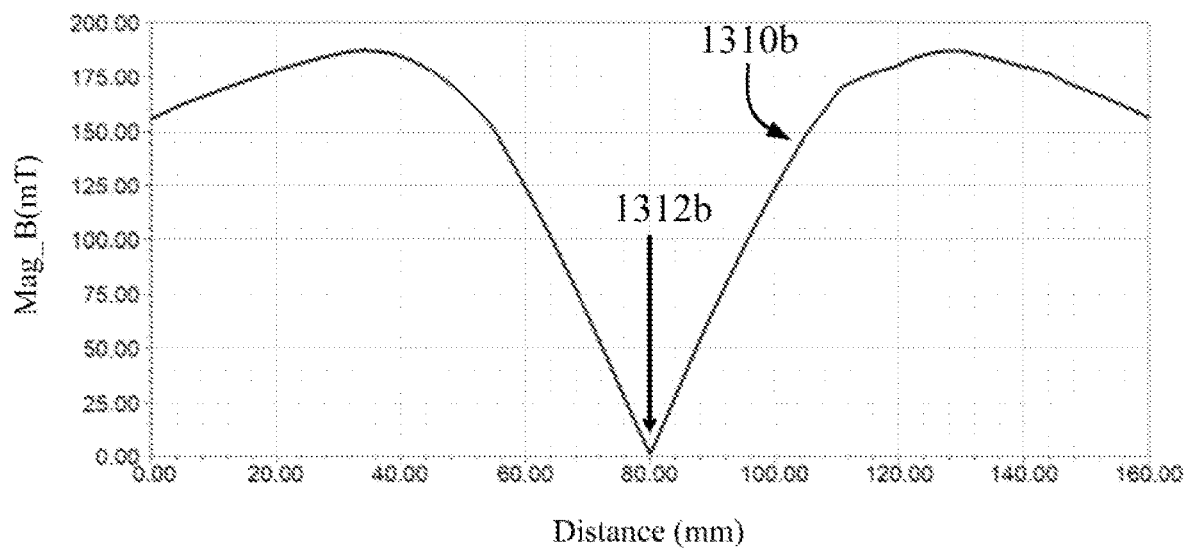
FIG. 13C shows magnetic flux density vs distance relationship for the electromagnetic actuation system of FIG. 13A where the size of workspace is 100 mm.

FIG. 13A illustrate an electromagnetic actuation system with eight electromagnetic devices under a third magnetic actuation mode according to certain embodiments of the present invention. FIG. 13B shows magnetic flux density vs distance relationship for the electromagnetic actuation system of FIG. 13A where the size of workspace is 160 mm. FIG. 13C shows magnetic flux density vs distance relationship where the size of workspace is 100 mm. The vertical axis represents magnetic flux density, while the horizontal axis represents distance.

As illustrated, coil 1, 4, 5 and 8 are energized with current of 20 A in clockwise direction, while coil 2, 3, 6 and 7 are energized with current of 20 A in counterclockwise direction. Representative magnetic field lines 1301, 1302, 1303, 1304, 1305, 1306, 1307, and 1308 are shown in FIG. 13A, where arrows indicate directions of the magnetic field lines.

A local minimum point of magnetic flux density is formed in the workspace. Curve 1310a is shown to have a local minimum point 1312a for the workspace of 160 mm. Curve 1310b is shown to have a local minimum point 1312b for the workspace of 100 mm. As the current magnitude in all the eight coils are the same, i.e., 20 A, the magnetic field at the center of the workspace is totally cancelled out and form a 0 mT point (zero-field point) in the workspace. By controlling the specific coordinate (i.e., location) of the local zero-field point, the gradient performance of the system can be enhanced.

By way of example, the specific coordinate may be modified or changed by adjusting the direction and/or magnitude of excitation current in the eight coils. In some embodiments, a mathematic model is used to characterize the relationship between the magnetic field and current. A current-field map (i.e., values of magnetic flux density in different coordinates under different current) in the workspace for each coil can be built. Therefore, eight current-field maps can be created when the system includes eight coils. Then, by setting the zero-field point in the specific coordinate, the required values of current used in the eight coils can be determined accordingly. Using the determined current to activate the coils, the local minimum point will fall at a location such that improved or optimized gradient performance of the system can be achieved.

As shown, the magnetic flux density and magnetic field gradient under this mode is around 51 mT at point 5 and 2.6 T/m at point 4 respectively for the workspace with a size of 160 mm. The magnetic flux density and magnetic field gradient in this mode is around 123 mT at point 5 and 6 T/m at point 2 and 4 respectively for the workspace with a size of 100 mm. The data are shown in Table 4.

Under this mode, both magnetic pulling and pushing force can be achieved as the vector for magnetic field gradient is in opposite directions near the zero-field point. This provides a broader applications for swarm control, such as controlling a swarm of microagents.

TABLE 4

Magnetic flux density and magnetic field gradient for workspace of 160 mm and 100 mm respectively under the third magnetic actuation mode with reference to FIG. 13A. The column Mag_B represents magnetic flux density, while the column Del_B represents magnetic field gradient.

| Point | Measuring point (mm) | Point A (mm) | Point B (mm) | Distance difference (mm) | Mag_B (mT) at measuring point | Del_B (T/m) at measuring point |
|---|---|---|---|---|---|---|
| Size of workspace = 100 mm | | | | | | |
| 1 | 60 | 59.9 | 60.1 | 0.02 | 121.23 | −5.48 |
| 2 | 70 | 69.9 | 70.1 | 0.02 | 63.43 | −6.12 |
| 3 | 80 | 79.9 | 80.1 | 0.02 | 0.04 | 0.18 |
| 4 | 90 | 89.9 | 90.1 | 0.02 | 67.37 | 6.15 |
| 5 | 100 | 99.9 | 100.1 | 0.02 | 123.91 | 5.23 |

TABLE 4-continued

Magnetic flux density and magnetic field gradient for workspace of 160 mm and 100 mm respectively under the third magnetic actuation mode with reference to FIG. 13A. The column Mag_B represents magnetic flux density, while the column Del_B represents magnetic field gradient.

| Point | Measuring point (mm) | Point A (mm) | Point B (mm) | Distance difference (mm) | Mag_B (mT) at measuring point | Del_B (T/m) at measuring point |
|---|---|---|---|---|---|---|
| Size of workspace = 160 mm | | | | | | |
| 1 | 60 | 59.9 | 60.1 | 0.02 | 51.24 | −2.41 |
| 2 | 70 | 69.9 | 70.1 | 0.02 | 26.37 | −2.58 |
| 3 | 80 | 79.9 | 80.1 | 0.02 | 0.67 | −2.52 |
| 4 | 90 | 89.9 | 90.1 | 0.02 | 26.66 | 2.59 |
| 5 | 100 | 99.9 | 100.1 | 0.02 | 51.78 | 2.36 |

The magnetic actuation modes as illustrated with reference to FIGS. 11A-13C are for illustrative purpose. Other magnetic actuation modes may be adopted for an electromagnetic actuation system with same or different configuration, such as including same or different number of electromagnetic devices.

As used herein, the term "actuation subject" refers to a microagent, a microrobot, or a microparticle, or a swarm of microagents, microrobots, or microparticles, etc. that can be driven by magnetic field.

As used herein, the term "workspace" refers to a space or area defined by one or more electromagnetic devices as described herein such that actuation subject can migrate therein to a target site or area. The workspace may be a two-dimensional area or three-dimensional space, with various shape or configuration, such as regular or irregular shape, depending on specific configuration of the one or more electromagnetic devices.

Unless otherwise defined, the technical and scientific terms used herein have the plain meanings as commonly understood by those skill in the art to which the example embodiments pertain. Embodiments are illustrated in non-limiting examples. Two or more embodiments may be combined in proper manners. Based on the above disclosed embodiments, various modifications that can be conceived of by those skilled in the art fall within scope of the example embodiments.

What is claimed is:

1. An electromagnetic device for generating a magnetic field in a workspace, the electromagnetic device comprising:
   an elongated sleeve defining a hollow space and having an external surface;
   a magnetic core having a first end, a second end, and a middle portion that is disposed between the first end and the second end and received in the hollow space, the first end being provided with a core tip that is shaped substantially as a cone and has a cone radius greater than zero;
   an electric coil wounded onto the external surface of the elongated sleeve and configured to generate the magnetic field when energized; and
   actuation means for actuating a relative movement between the magnetic core and the elongated sleeve such that the workspace is modified.

2. The electromagnetic device of claim 1, further comprising fixation means for positioning the electric coil onto the elongated sleeve.

3. The electromagnetic device of claim 2, wherein the fixation means includes a first fixation means and a second fixation means such that the electric coil is limited between the first fixation means and the second fixation means, wherein each of the first fixation means and the second fixation means is of a shape selected from a group consisting of a cylindrical shape and a polygonal shape.

4. The electromagnetic device of claim 1, wherein the actuation means includes a motor, the output of the motor being coupled to the second end of the magnetic core such that the magnetic core is actuated to move linearly relative to the elongated sleeve.

5. The electromagnetic device of claim 4, where the actuation means further includes a lead screw shaft driven by the motor, the lead screw shaft being driven to actuate the magnetic core to conduct linear movement.

6. The electromagnetic device of claim 1, wherein each of the elongated sleeve and the magnetic core includes a material capable of being magnetized.

7. The electromagnetic device of claim 1, wherein the radius of the magnetic core is in a range from 30 mm to 40 mm, the length of the magnetic core is in a range from 500 mm to 600 mm, the height of the core tip is in a range from 50 mm to 60 mm, the cone radius of the corn tip is in a range from 5 mm to 15 mm, the length of the elongated sleeve is in a range from 400 mm to 500 mm, and the diameter of the elongated sleeve is in a range from 50 mm to 60 mm.

8. An electromagnetic actuation system for generating a gradient-enhanced magnetic field in a workspace, the system comprising one or more pairs of electromagnetic devices, each electromagnetic device including an elongated sleeve that defines a hollow space and has an external surface, an electric coil wounded onto the external surface of the elongated sleeve, a magnetic core, and actuation means for actuating a relative movement between the magnetic core and the elongated sleeve, the magnetic core having a first end, a second end, and a middle portion that is disposed between the first end and the second end and received in the hollow space, the second end being coupled to the actuation means,
   wherein the electromagnetic devices are configured to be activated such that the gradient-enhanced magnetic field is generated in the workspace,
   wherein the relative movement between the magnetic core and the elongated sleeve for one or more of the electromagnetic devices modifies the workspace.

9. The electromagnetic actuation system of claim 8, wherein the magnetic core includes a core tip disposed at the first end, and the core tip is shaped substantially as a cone and has a non-zero cone radius.

10. The electromagnetic actuation system of claim 8, further comprising a magnetic frame, the magnetic frame including a top base, a bottom base, and a plurality of magnetic bridges bridging the top base and the bottom base.

11. The electromagnetic actuation system of claim 10, wherein the magnetic bridges include a material selected from a group consisting of DT4E, low carbon steel, pure iron, and cast iron.

12. The electromagnetic actuation system of claim 10, wherein each magnetic bridge includes a first section, a second section, and a middle section disposed between the first section and the second section,
wherein each magnetic bridge connects a first electromagnetic device and a second electromagnetic device of the one or more pairs of electromagnetic devices, the second end of the magnetic core of the first electromagnetic device passing through the first section, the second end of the magnetic core of the second electromagnetic device passing through the second section.

13. The electromagnetic actuation system of claim 12, wherein the third section has a surface opposite to the workspace, the surface being of a rectangular shape with a length and a width, the length being along a direction from the second end of the magnetic core of the first electromagnetic device towards the second end of the magnetic core of the second electromagnetic device, the length being in a range from 50 cm to 60 cm, the width being in a range from 35 cm to 45 cm.

14. The electromagnetic actuation system of claim 8, wherein the actuation means includes a servomotor configured to actuate respective magnetic core to achieve a linear motion in a range from 1 mm to 160 mm, thereby generating a magnetic field gradient at the center of the workspace in a range from 0.1 T/m to 15 T/m.

15. A method of generating a gradient-enhanced magnetic field in a workspace defined by an electromagnetic actuation system, the electromagnetic actuation system including one or more pairs of electromagnetic devices, each electromagnetic device including an elongated sleeve that defines a hollow space and has an external surface, an electric coil wounded onto the external surface of the elongated sleeve, a magnetic core, and actuation means for actuating a relative movement between the magnetic core and the elongated sleeve, the method comprising:
grouping the one or more pairs of electromagnetic devices into one or more groups;
forming activation strategies for the one or more groups, the activation strategies including one or more of selections including which groups are to be activated, values of energizing current for each electric coil, direction of the energizing current, and distance between each magnetic core and center of the workspace; and
generating the gradient-enhanced magnetic field by adopting the activation strategies for the one or more groups.

16. The method of claim 15, further comprising adjusting magnetic field gradient at the center of the workspace by linearly changing the distance between the magnetic cores of one or more of the electromagnetic devices and the center of the workspace.

17. The method of claim 15, further comprising:
energizing a first group using a first energizing current value in a first direction, energizing a second group using the first energizing current value in a second direction opposite to the first direction; and
obtaining an optimized magnetic field gradient in the workspace by adjusting geometric parameters for the one or more pairs of electromagnetic devices.

18. The method of claim 15, further comprising:
forming a local minimum point of magnetic flux density by energizing a first group using a first energizing current value in a first direction, energizing a second group using the first energizing current value in a second direction opposite to the first direction, energizing a third group using a second energizing current value in the first direction, and energizing a fourth group using the second energizing current value in the second direction; and
obtaining an optimized magnetic field gradient in the workspace by adjusting location of the local minimum point.

19. The method of claim 15, further comprising:
forming a local minimum point of magnetic flux density by energizing a first group and a second group using a first energizing current value in a first direction, and energizing a third group and a fourth group using the first energizing current value in a second direction opposite to the first direction, wherein magnetic field is zero at the local minimum point; and
obtaining an optimized magnetic field gradient in the workspace by adjusting location of the local minimum point.

* * * * *